United States Patent
Morrison et al.

(10) Patent No.: US 7,461,561 B2
(45) Date of Patent: ***Dec. 9, 2008

(54) APPARATUSES AND METHODS FOR MONITORING STRESS IN STEEL CATENARY RISERS

(75) Inventors: Denby Grey Morrison, Houston, TX (US); Jeremy R. Dean, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,742

(22) Filed: Jun. 27, 2006

(65) Prior Publication Data

US 2006/0230839 A1    Oct. 19, 2006

Related U.S. Application Data

(63) Continuation of application No. 10/228,385, filed on Aug. 26, 2002.

(51) Int. Cl.
*G01L 1/24* (2006.01)
(52) U.S. Cl. .................................................. 73/800
(58) Field of Classification Search ............... 73/800, 73/766, 705
See application file for complete search history.

(56) References Cited

U.S. PATENT DOCUMENTS

| | | | |
|---|---|---|---|
| 4,194,401 A | 3/1980 | Claassen et al. ............... 73/730 |
| 4,205,379 A | 5/1980 | Fox et al. ..................... 364/432 |
| 4,217,782 A | 8/1980 | Pont ............................. 73/637 |
| 4,351,027 A | 9/1982 | Gay et al. .................... 364/432 |
| 4,636,638 A | 1/1987 | Huang et al. ............. 250/231.1 |
| 4,654,520 A | 3/1987 | Griffiths ..................... 250/227 |
| 4,731,744 A | 3/1988 | Harrell, Jr. et al. .......... 364/560 |
| 4,793,737 A | 12/1988 | Shotbolt ..................... 405/169 |
| 4,812,645 A | 3/1989 | Griffiths ..................... 250/227 |
| 5,006,845 A | 4/1991 | Calcar et al. ................ 340/853 |
| 5,026,141 A | 6/1991 | Griffiths |
| 5,525,796 A | 6/1996 | Haake ................... 250/227.15 |
| 5,845,033 A | 12/1998 | Berthold et al. |
| 6,062,769 A | 5/2000 | Cunningham ............ 405/195.1 |
| 6,276,456 B1 | 8/2001 | Head ......................... 166/359 |

(Continued)

FOREIGN PATENT DOCUMENTS

JP    2000075174    3/2000

(Continued)

OTHER PUBLICATIONS

Remo Z. Machado, et al.—"Monitoring Program for the first Steel Catenary Riser Installed in a Moored Floating Platform in Deep Water", pp. 801-810, vol. 2, Sep. 13-16, 1999.

*Primary Examiner*—Edward Lefkowitz
*Assistant Examiner*—Octavia Davis
(74) *Attorney, Agent, or Firm*—William Edward Hickman

(57) ABSTRACT

The invention describes apparatuses and methods of monitoring fatigue, structural response, and operational limits in structural components. More particularly, the present invention relates to fatigue, response, and operational monitoring systems on steel catenary risers using optical fiber sensors. The sensors can be pre-installed on new risers, or post-installed sub-sea on existing risers, using a variety of methods.

16 Claims, 25 Drawing Sheets

U.S. PATENT DOCUMENTS

| | | | |
|---|---|---|---|
| 6,332,361 B1 | 12/2001 | Yamada et al. | 73/627 |
| 6,868,737 B2 | 3/2005 | Croteau et al. | 73/800 |
| 6,959,604 B2 | 11/2005 | Bryant et al. | 73/705 |
| 2005/0005712 A1* | 1/2005 | Gysling et al. | 73/861.23 |
| 2005/0072216 A1* | 4/2005 | Engel | 73/53.01 |

FOREIGN PATENT DOCUMENTS

| | | |
|---|---|---|
| WO | WO9302916 | 2/1993 |
| WO | 00/68657 | 11/2000 |

* cited by examiner

Illustration of the Movement of the Touchdown Point for an SCR

Touchdown Point

FBG and Electrical Strain Gauge Comparison

SCRFT 1 to 11 Test Setup

SCRFT 12 to 31 Setup

SCRFT 12 to 31 Pipe Rotation

Conversion of Piggyback Pipe Strain to SCR Strains

SCRFT 12 to 31 Test Results – Clamp Type

SCRFT 12 to 31 Test Results – Rotation of Piggyback Sensors

SCRFT 12 to 31 Test Results

SCRFT 33 Test Setup

SCRFT 33 Test Data

SCRFT33

SCRFT 33 Analysis of Test

Piggyback Strain Calculations

Test Setup

Station Setup

Test Setup – Detailed Site Plan

MODEL TEST OF SCR OPTICAL SENSOR FATIGUE MEASUREMENT SYSTEM

DETAILED SITE PLAN

MT-200

Key

Staircase

Vehicle Access

Test Work Area (Wave Tank Building - Second Floor and Roof)

Clamp Raw Data

Filtered Data

Principle Strain Direction

APPARATUSES AND METHODS FOR MONITORING STRESS IN STEEL CATENARY RISERS

RELATED APPLICATIONS

This application is a continuation of co-pending U.S. patent application Ser. No. 10/228,385, filed on Aug. 26, 2002. U.S. patent application Ser. No. 10/228,385 is herein incorporated by reference in its entirety.

FIELD OF THE INVENTION

This invention generally relates to apparatuses and methods of monitoring fatigue, structural response, and operational limits in structural components. More particularly, the present invention relates to fatigue, response, and operational monitoring systems on steel catenary risers using optical fiber sensors.

BACKGROUND OF THE INVENTION

Oil and gas production in deep and ultra-deep water presents many challenges, one of them being the design of technical and cost effective riser systems (the conduit between the sea floor and the host platform). In many deepwater areas where hydrocarbons are found, such as the Gulf of Mexico, severe current loading is invariably expected. High current can generate vortex-induced vibrations (VIV) that give rise to high rates of riser fatigue damage accumulation. As water depth increases, riser designs become more varied and VIV behavior presents one of the biggest uncertainties facing the riser engineers.

A major concern in offshore oil and gas operations, therefore, is uncertainty as to how much life remains in the riser systems, whether a drilling or production riser. Miscalculations as to remaining life can lead to sudden and catastrophic losses in containment of hydrocarbons. As such, exploration and production companies are more likely to err on the side of conservatism, for example, choosing to shut-in production with million dollar repercussions in revenue, rather than risk failure.

At present, the stress and strains in a steel catenary production riser (SCR) are not monitored, but instead are estimated based on sea current data, theoretical models, estimates of boundary conditions, and changeable structural data. Confidence in the calculations is low and a factor of safety of ten to twenty is applied to the calculated life. Judgment and guess-work are used when predicting whether an existing SCR's production life should be extended. Misjudgment in the remaining life of a riser could lead to catastrophic loss of containment of hydrocarbons and the resulting negative impacts would be severe.

Similarly, the fatigue effect of large metocean events on risers is not well known. Metocean events may include extreme wind speeds or storm surges from hurricanes and large eddy currents at great depths. The fatigue of any riser that has experienced these events introduces an additional level of uncertainty. By monitoring the riser through one of these large metocean events, the precise level of fatigue will be recorded and evaluated. This data could also allow better assessment of previous fatigue due to large metocean events.

In addition, the soil/pipe interaction of a SCR at the Touch Down Point (TDP), the point where the riser contacts the sub-sea floor, is not well understood. This point is where the greatest changes in stress and strain exist on the SCR. Strain monitoring at the TDP would improve the understanding of this interaction. Once a better understanding is gained, improvements in design and decision-making can be made.

Additionally, operational moves by the platform supporting the SCR can cause significant movement of the TDP adding to suspected trenching and interaction of the pipe with the sea floor. Large trenches have been observed in SCR-pipeline surveys, leading to concerns as to the impact on the serviceability of the riser. Optical strain monitoring would significantly address this uncertainty and allow for operational guidance in moving the platform around. Likewise, monitoring of the top-end of the SCR will assist in guiding operational platform movements, by prescribing and monitoring acceptable stress and deformation (inclination) of the top end of the SCR.

Large temperatures encountered in many reservoirs produce temperatures in excess of 200° F. (93.33° C.) (often as high as 350° F.-176.667° C.) in the riser pipe as the hydrocarbons move up to the surface. Temperatures of this magnitude can cause very large mechanical strains and cycling of strains as the temperatures fluctuate. This is poorly understood through present theoretical models, and is of great concern in the safe operation of production-type risers and flowlines on the sea floor.

To aggravate conditions, hydrocarbons can often be "sour" in that they produce highly corrosive environments on the pipe interior. Whereas some strategies to counter this include very expensive corrosion resistant alloys (CRA's), monitoring of changes in the wall thickness would be of great importance in safe offshore operations.

Accordingly, there remains a substantial need for a solution to the problem of monitoring fatigue, operational behavior, and stresses on drilling and production risers.

SUMMARY OF THE INVENTION

The present invention is directed to apparatuses and methods of monitoring fatigue in structural components. More particularly, the present invention relates to fatigue monitoring systems on steel catenary risers using optical fiber sensors. As discussed in more detail below, the sensors can be pre-installed on new risers, or post-installed sub-sea on existing risers, using a variety of methods.

In one embodiment, the apparatus comprises a plurality of optical fiber strain sensors fixed directly to the outer surface of the pipe or conduit to be monitored. In another embodiment, a method for monitoring fatigue on drilling and production risers is described. The method includes use of optical-fiber-instrumented clamps and devices that in turn are attached to the pipe or conduit of interest and concern, such that the strains in the pipe or conduit can be inferred from the measurements taken off the attached device or clamp.

In one embodiment, the present invention is directed to an apparatus for monitoring fatigue, structural response, and operational limits on steel catenary risers comprising:

a multi-strand optical cable that extends down the length of the riser, and a plurality of optical fiber strain sensors attached to the outer surface of the riser, said sensors being connected to said optical cable.

Other embodiments of the invention include using a very large and dense array or blanket of strain gauges over a relatively short pipe section, say 1 to 2 feet (0.305-0.610 m) in length, in order to detect small changes in wall thickness or pitting caused by erosion or corrosion of the inner surfaces.

Yet another application would be to allow for a plurality of gauges on the riser or extension thereof (the flowlines) on the sea floor (over a similar spacing and extent as that in a TDP configuration) that could be subjected to significant temperature-induced strain fluctuations. The large mechanical strains caused by temperatures—that could be in the range of 200° F. to 350° F. (93.33° C. to 176.67° C.)—are poorly understood and of concern to safe operation.

Lost or deferred production could run into the millions of dollars should the risers, or flow lines, be deemed unserviceable. This has happened to vertical export riser configurations on major offshore platforms in the Gulf of Mexico. The fiber-optical based monitoring configurations, and inventions herein could avoid these huge losses in income, possible threat to the environment from ruptured pipes, and the possible loss of life.

The foregoing summary has outlined rather broadly the features and technical advantages of the present invention so that the detailed description of the invention that follows may be better understood. Additional features and advantages of the invention will be described hereinafter, which form the subject of the invention. It should be appreciated by those skilled in the art that the conception and the specific embodiments disclosed might be readily used as a basis for modifying or designing other apparatuses and methods for carrying out the same purposes of the present invention. It should also be realized by those skilled in the art that such equivalent constructions do not depart from the spirit and scope of the invention as set forth and claimed herein.

BRIEF DESCRIPTION OF THE DRAWINGS

The accompanying drawings, which are incorporated in and form a part of the specification, illustrate the embodiments of the present invention, and, together with the description, serve to explain the principles of the invention. In the drawings.

It is to be noted that the drawings illustrate only typical embodiments of the invention and are therefore not to be considered limiting of its scope, for the invention will admit to other equally effective embodiments.

DETAILED DESCRIPTION OF THE INVENTION

The use of optical fibers to measure strain and compute fatigue on structural components has many applications. The configuration of the system depends on the application, what needs to be monitored and recorded, and whether the system is pre-installed or post-installed. The fundamental elements of all the systems are generally the same, with the locations and arrangement of the sensors being adjusted. Here, an application for steel catenary risers (SCR) is described.

In general, the present invention monitors strains on a SCR in the touch down area using a plurality of optical fiber sensors. A similar array of fiber-optics gauges can be used at the top end of a vertical riser or SCR to monitor the behavior, fatigue, and impact of operational movements on the risers. The sensors allow the pipe fatigue to be determined from measured strain variations, the behavior of the pipe to be monitored, the touchdown point of the SCR to be located, and the on-bottom behavior (like trenching, and temperature-induced strains) to be monitored. At present, SCR's are not monitored, their touch-down zone and Vortex Induced Vibration (VIV) behavior is not well understood, and they are designed based on theoretical values. This system allows the behavior of SCR's to be understood allowing informed decisions on the riser to be made, structural failures to be avoided, and massive possible health, safety, and environmental disasters to be protected against.

The SCR fatigue monitoring system has two installation methods.

When a new SCR is to be monitored, the sensors can be "pre-installed," that is, the sensors can be fixed to the pipe before installation. This method allows the strain sensors to be epoxied or clamped to the SCR in the pipe yard or on the deck of the installation vessel. The sensors are then connected to the main optical cable, as the SCR is being laid, such as in a J-lay or S-lay operation.

When an existing SCR is to be monitored, the sensors can be "post-installed," that is, the sensors can be fixed to the pipe underwater using a remotely operated vehicle (ROV). Several installation methods can be used. One method allows the sensors to be installed sub-sea on an existing riser using a "piggyback" concept. The piggyback concept uses clamps, instrumented with strain sensors, which are fastened to the SCR with the underwater ROV. The clamp provides sufficient force to act as a composite section with the SCR. While this installation is more complicated, it allows an existing SCR to be instrumented and monitored.

Figure 1:
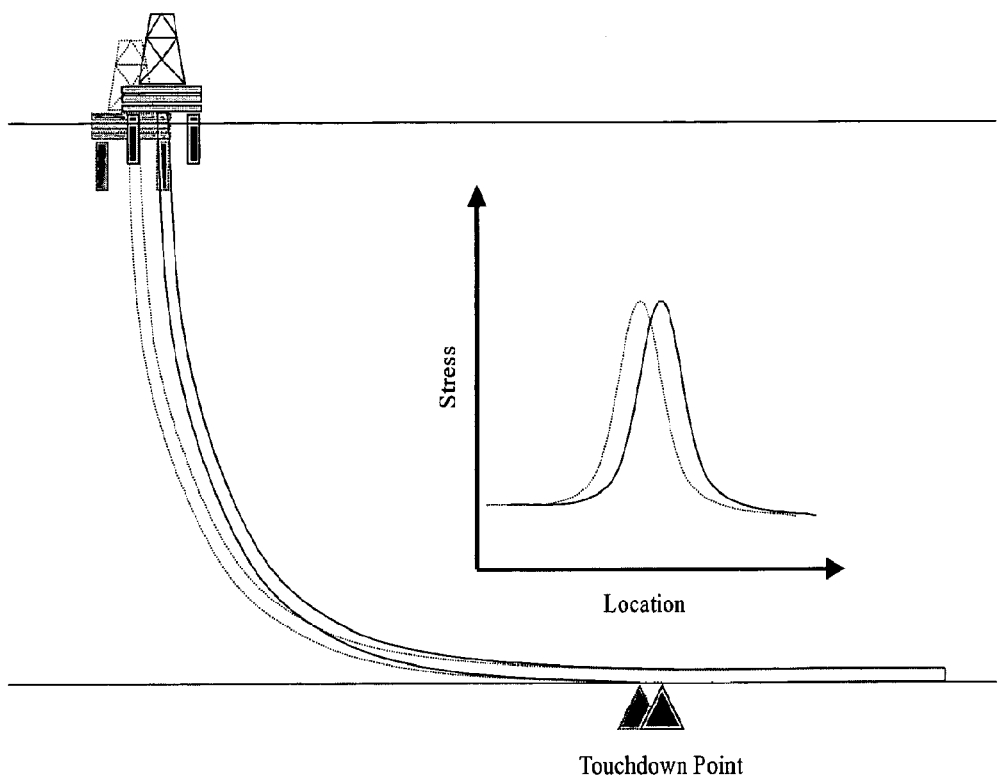
FIG. 1 illustrates the movement of the touchdown point for a steel catenary riser.

FIG. 1 illustrates how the vessel heave results in the movement of the SCR touchdown point (TDP), the point where the pipe riser contacts the sub-sea floor. Specifically, FIG. 1 shows a floating production vesssel 10 being subject to heave (the rise and fall of the waves or swell of the sea) from position A to position B. The heave in the vessel 10 also causes the riser 12 to heave or change position, thus moving the location of the touchdown point 14 of the riser 12 on the sub-sea floor 16. The stress concentrations are shown on the graphical insert, indicated as 18. The maximum change in the stress results in the greatest amount of fatigue. This occurs at the TDP 14. As such, the present invention provides sufficient sensor stations, both before and after the TDP area, in order to successfully monitor the TDP and changes in stress and strain.

Figure 2:
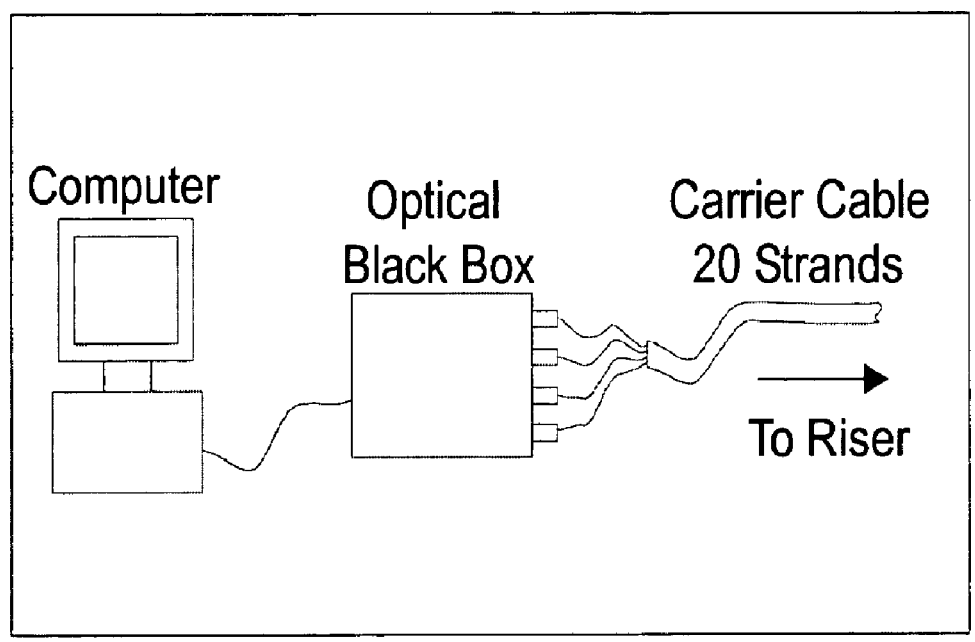
FIG. 2 is a diagram showing an embodiment of the system configuration of the present invention comprising a computer, an optical black box, and a multi-strand optical cable.

Turning now to FIG. 2, there is shown an embodiment of a system configuration of the present invention. The configuration comprises a computer 20 and an optical black box 22 located on the vessel, and a multi-strand optical cable 24 that extends down the length of the riser 12 to the touchdown area. A plurality of sensors (described below) is connected to the main carrier cable 24 to record the strains in the touchdown zone of the riser 12, which are relayed to the computer 20 in real time. The magnitude and direction of the principle strain and the number of stress-strain cycles can be counted and accumulated as total fatigue. The accumulated fatigue can be compared to known SN curves of established metals to produce a percentage of used fatigued life.

The computer 20 can be off-the-shelf PC's or DAQ-type workstations depending on the amount of data interpretation, manipulation or storage required.

The optical black box 22 can be purpose built, purchased, or assembled by companies like Astro Technology, a Houston-based specialist in fiber-optics technology. It provides the light source, interrogates the signal to understand the changes in frequency that can be related back to minute changes in the optical fibers (and strain gauges), and may compensate for known effects on the signals caused by temperature effects.

The multi-strand optical cable 24 can be assembled from fiber optics strand components and ruggedized and armored by cable companies like McArtney in Houston, such that it is protected for the intended environment in practical diameters of ½ inch to ¾ inch (1.27-1.905 cm), and lengths of 10,000 feet (3.048 km) as the particular location requires.

Figure 3:
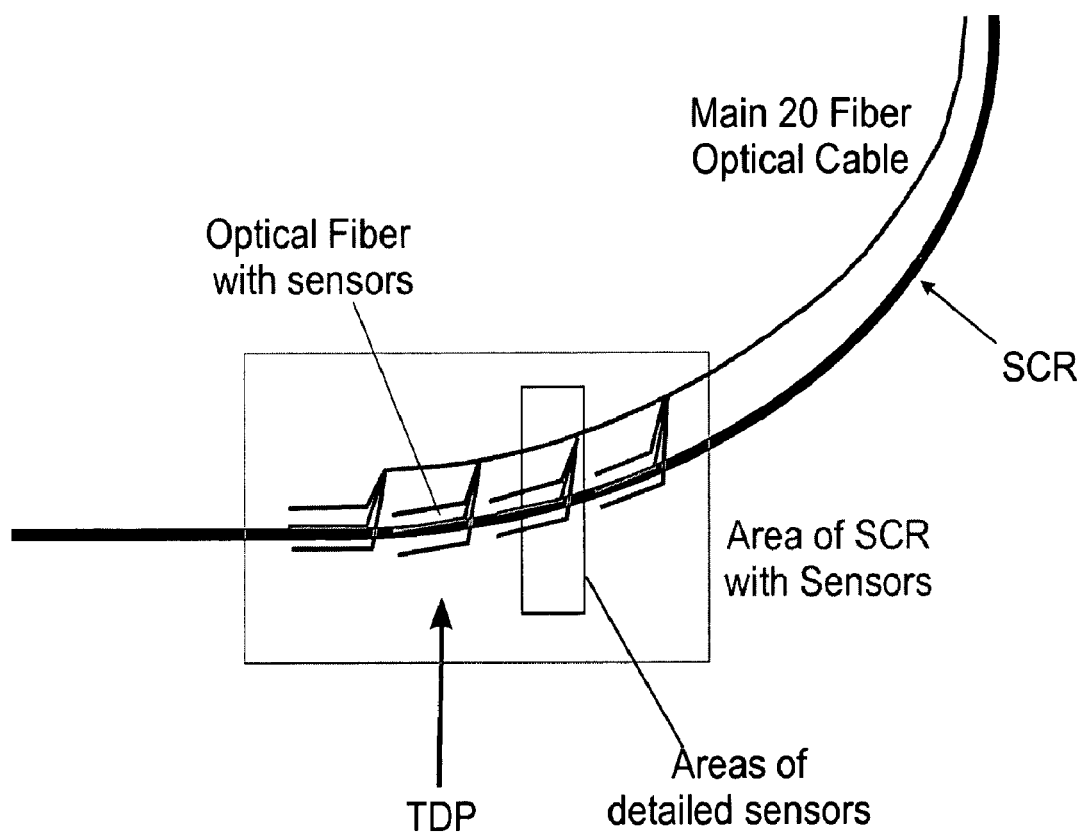
FIG. 3 illustrates an embodiment of an optical fiber sensor arrangement on a steel catenary riser.

In FIG. 3, there is shown an embodiment of an SCR optical fiber sensor arrangement of the present invention. Here, the main carrier cable 24 extends from the vessel 10 along the length of the riser 12 to a point 40 beyond the touchdown point 14. The optical cable 24 has four breaks out locations 31, 32, 33, and 34, where four separate optical fibers with sensors "break out" of the cable and run along the SCR 12 at 90-degree angles. For example, break out location 31 has optical fibers 311, 312, 313, 314; break out location 32 has optical fibers 321, 322, 323, 324, and so on for the other break out locations. As discussed in more detail below, each of the four optical fibers (at each of the break out locations) will have a plurality of strain sensors.

Figure 4:
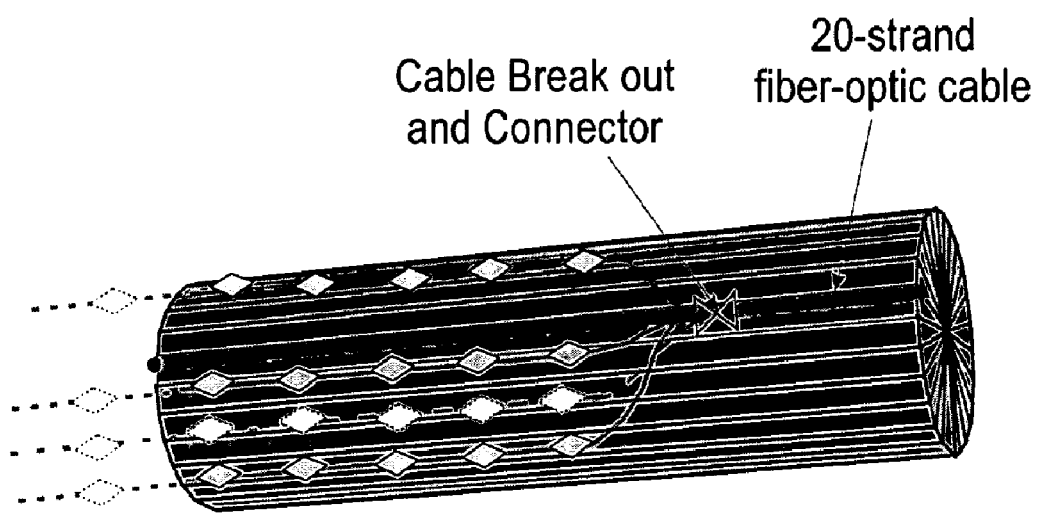
FIG. 4 illustrates, in detail, the sensor location and cable break out seen in FIG. 3.

FIG. 4 illustrates, in greater detail, break out location 33 seen in FIG. 3. The cable 24 is shown running the length of the riser 12. At cable break out location 33, a connector 50 connects four separate optical fibers 331, 332, 333, and 334 to the carrier cable 24. One of the main functions of the connector is to allow for practical running and deployment of the system through quick-connect of the pre-installed gauge stations with the main carrier cable while the riser is being made up. The instrumented pipe sections could be made up ahead of time, whereas the carrier cable could be deployed continuously off a reel on the deployment platform (J-lay barge; work vessel; drilling rig; production platform; etc.). The connectors can be obtained from specialist manufacturers or through consultants like Astro Technology of Houston. The connectors are about 12 inches in length and 2 to 3 inches (5.08-7.82 cm) in diameter at the maximum thickness location. The connector 50 allows each optical fiber to join the main optical cable. The optical fibers 331, 332, 333, and 334 also run along the riser 12 at 90-degree angles. Each optical fiber has a plurality of sensors, indicated in FIG. 4 as a diamond. For example, optical fiber 331 has sensors 331-1, 331-2, 331-3, 331-4, 331-5, 331-6, etc., optical fiber 332 has sensors 332-1, 332-2, 332-3, 332-4, 332-5, 332-6, etc., and so on for the other optical fibers. The sensors are mounted axially to the riser and at 90 degrees from each other on the circumference of the pipe. The 90-degree interval of strain measurement was derived because the FBG sensors, which measure strain at a point, proved to be the most reliable gauge for the intended dynamic application.

The number of sensors on each optical fiber is a function of the designer's desires and his or her need to obtain data points of interest. In the present invention, it is preferred to have a total of 16 sensors per optical fiber. A significant advantage of the present configuration and the fiber-optics technology is the ability to carry multiple signals down a single fiber. A practical number of 16 off one strand was used because it provided the level of redundancy and configuration sought in the SCR and related applications. Each sensor measures the direction of the strain, either circumferentially or longitudinally, and the magnitude of the strain, both for the pipe in tension or in compression. A suitable spacing of the sensors has been assessed as 10 feet (3.048 m), resulting in a four optical fiber group covering 160 feet (48.768 m). Ten feet (3.048 m) was determined by sea floor observations, calculation, and experimentation to be a practical spacing that is close enough to capture the very sharp changes in stress in termination points in a riser (like the SCR TDP or top-end), and yet be far enough apart so that multiple locations can be monitored over a long-enough expanse of riser to capture a changing termination point, as in the touch down point on the sea floor.

With this spacing, FIG. 4 shows a plurality of station locations 61, 62, 63, 64, and so on. (FIG. 4 shows five stations on the SCR, with an additional station to the left of the pipe.) Each station location will incorporate one sensor from each optical fiber. The data from the four sensors at the same length along the SCR will be combined to give the strains at that one station location. Specifically, sensor 331-1 from fiber 331, sensor 332-1 from fiber 332, sensor 333-1 from fiber 333, and sensor 334-1 from fiber 334, are combined at station location 61. This arrangement, of course, allows for system redundancy. In addition, the grouping of the sensors to form a station location could be easily adjusted to acquire additional data at particular areas of interest.

In this fashion, four separate breakout groups, such as 31, 32, 33, and 34, provides coverage for 640 feet (195.072 m) of SCR to be monitored, allowing accurate measurement of the TDP, while having sufficient distance to either side to allow the TDP to shift in location (with the vessel heave) and still be able to record useful information. As before, 640 feet (195.072 m) of coverage around the TDP was determined by sea floor observations, calculation, and experimentation to be a practical length to capture the very sharp changes in stress in termination points in a riser (like the SCR TDP or top-end), and allow for a changing touch down point on the sea floor.

Figure 5:
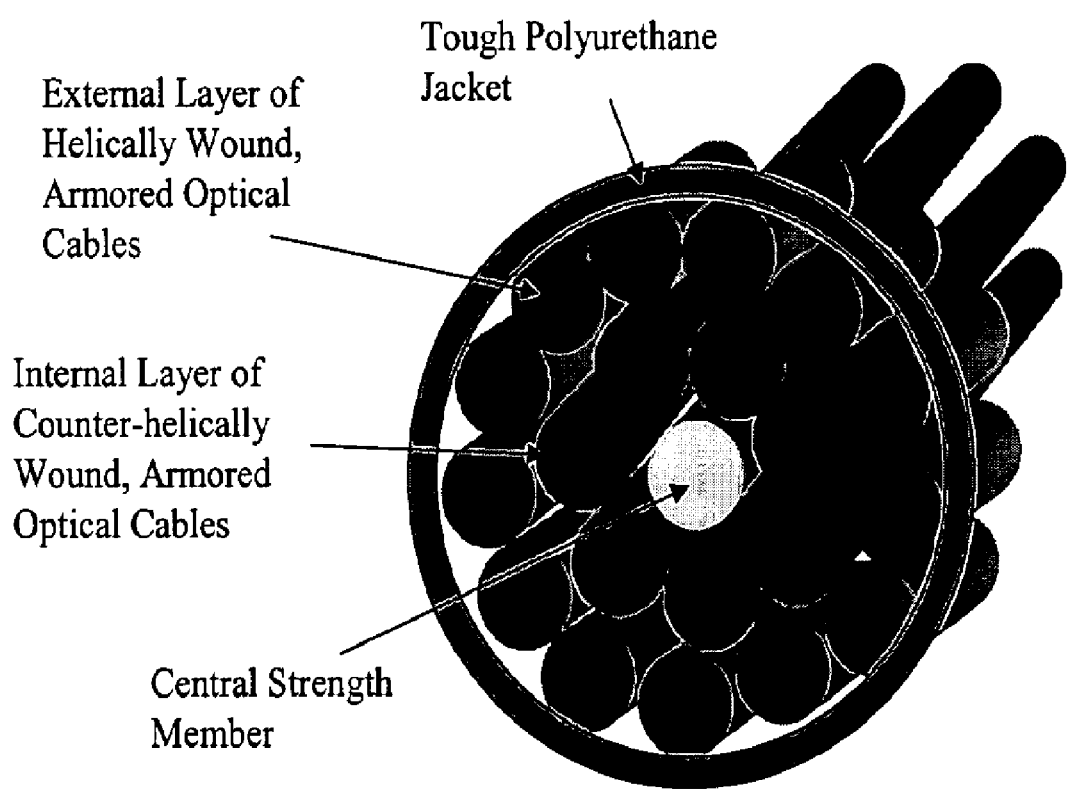
FIG. 5 is a detailed cross section of the multi-strand cable of the present invention.

FIG. 5 shows a cross section of the main multi-strand optical cable 24. The optical cable 24 is comprised of a central strength member 26, which may be comprised of metal wire of other materials having suitable stiffness and strength properties. A series 28a, 28b, 28c, 28d, 28e, 28f, 28g, of counter-clockwise, helically wound, armored cables, are arrayed concentrically about the central strength member 26. A second group of clockwise helically wound, armored cables 30a, 30b, 30c, 30d, 30e, 30f, 30g, 30h, 30i, 30j, 30k, 30l, 30m are arranged concentrically about the inner set of optical cables 28a-28g. The entire assembly is protected by a water-roof, polyurethane jacket 32. It will be appreciated that other materials may be used for the jacket. Moreover, it will be appreciated that the entire assembly may be filled with resin or other potting materials to assist in providing strength and structural integrity.

Each optical fiber will carry the signals from several sensor stations back to the black box. The cable will break out and be connected to the sensor clamp. Optical fiber sensors have numerous benefits, including multiplexing capability, immunity to electromagnetic interference (EMI), and capability to instrument long distances without signal loss. Some other key benefits of fiber-optic sensors over conventional sensor systems are that they: are lightweight and small in size—about the diameter of a human hair, are rugged and have a long life—the sensors will last indefinitely, are inert and corrosion resistant, have little or no impact on the physical structure, can be embedded or bonded to the exterior, have compact electronics and support hardware, have high sensitivity, are multifunctional—they can measure strain, temperature, pressure, and vibration, provide continuous real-time monitoring, require no electric current, and are safe to install and operate around explosives or flammable materials.

As discussed above, the SCR fatigue monitoring system has two installation methods.

When a new SCR is to be monitored, the sensors can be "pre-installed," that is, the sensors can be fixed to the pipe before installation. This method allows the strain sensors to be epoxied or clamped to the SCR in the pipe yard or on the deck of the installation vessel. The sensors are then connected to the main optical cable as the SCR is being laid. Special epoxies have been tried in order to achieve the desired adhesion to the pipe surface in a very aggressive offshore environment over periods of tens of years. The "clamps" envisioned in this pre-installed configuration are different from the post-installed clamp discussed elsewhere. The post-installed clamp has sensors attached to it and the clamp forms the interface with the pipe or conduit of interest.

When an existing SCR is to be monitored, the sensors can be "post-installed," that is, the sensors can be fixed to the pipe underwater using a remotely operated vehicle (ROV). Several installation methods can be used depending upon the SCR configuration.

One method of installing the sensors on an existing riser involves the use of an instrumented curved plate that is attached to the SCR with sub-sea epoxy. The plates are placed along the length of the riser using an underwater ROV. The curved plate would be of a compatible material, like corrosion-resistant steel, spaced out at similar distances as the 10 foot-like intervals. The length monitored can be less than the 640 feet (195.072 m) pre-installed configurations lengths as the uncertainty in the position of the TDP is removed for post installed systems.

Another method allows the sensors to be installed sub-sea using a "piggyback" concept. The piggyback concept uses clamps, instrumented with strain sensors, which are fastened to the existing SCR with the underwater ROV. The clamp provides sufficient compressive force to act as a composite section with the SCR. With this method, the sensors on the clamp monitor the strains experienced by the clamps. The strains on the clamps are recorded, allowing the amplitude and the number of stress-strains cycles of the SCR to be calculated. The amplitude and the number of stress-strains cycles, together with the SN curve of the SCR pipe, allow the fatigue and remaining life of the riser to be calculated. In general, the fatigue assessment tracks the number ("N"-axis in the SN-curve) of stress ranges ("S" axis in the SN-curve) over a period of time to determine the accumulation of damage or "fatigue." SN-curves are usually experimentally determined fatigue failure relationships between stress range and cycle numbers. In general there are numerous types of SN curves that can be a function of the material (type of steel) or detail (like the pipe wall or the weld location).

Yet a third method of installing the sensors to the existing riser combines the instrumented clamps and the use of sub-sea epoxy.

Other methods of installing the sensors to the steel catenary risers are known to those skilled in the art, depending upon the configuration of the riser and the protective coating and insulation of the riser.

Figure 6:
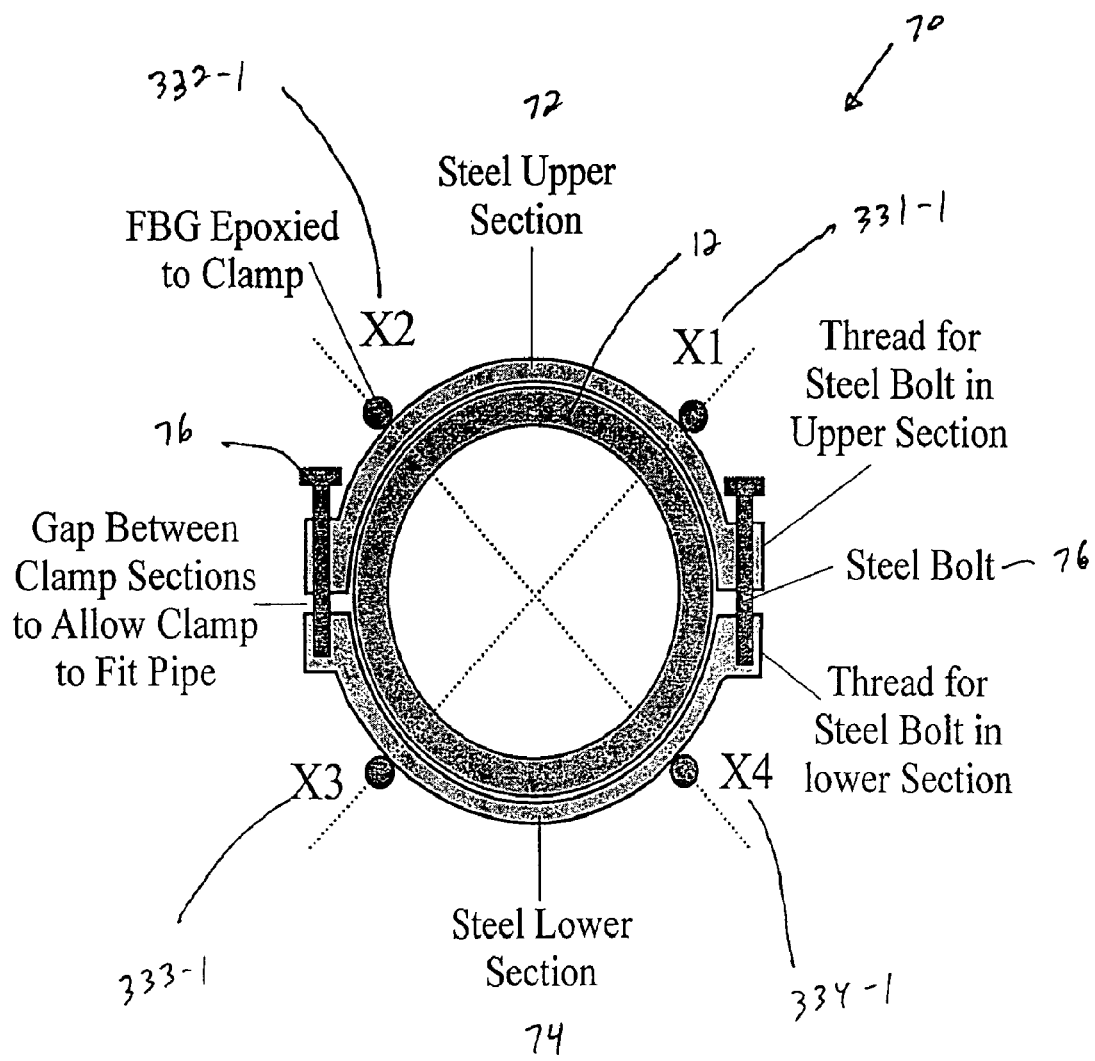
FIG. 6 is a cross section of a clamp of the present invention.

FIG. 6 shows a cross section of a clamp 70 used in the present invention. The clamp 70 consists of upper 72 and lower 74 sections fastened together by steel bolts 76. The clamp would be made of a compatible material, like corrosion-resistant metal or inconnel, fabricated by a machine shop familiar with the fabrication of offshore equipment. Instrumentation of the clamp would be done by specialty optical fiber consultants like Astro Technology of Houston, or qualified technicians within a major operating company like Shell. The force holding the clamp 70 to the pipe 12 increases as the bolts 76 are tightened. As is known to those skilled in the art, the contact between the pipe 12 and the clamp 70 could be difficult due to surface irregularities, ovality in the pipe, and uncertainty in the pipe dimensions. Accordingly, the clamp has sufficiently thin wall thickness to allow flexing to the pipe section of interest. This flexibility allows the clamp to have good contact even under difficult or irregular conditions. The thread sections for the steel bolts 76 are thicker to allow for the greater stress at these locations. The sensors 331-1, 332-1, 333-1, and 334-1 are mounted axially to the clamp 70 and at 90-degrees from each other on the circumference of the pipe riser 12.

For ease of ROV installation, the optical fibers should be as flexible as possible. The four fibers would be epoxied around the side of the clamp, and run together inside a plastic coating to the next clamp, where they would then separate and connect to the sensor location. For storage and transportation, the clamps could be stacked side by side and the plastic-coated fibers looped from one clamp to the next clamp. Once lowered to the sea floor, the ROV would install one clamp at a time.

As indicated above, another problem of risers is vortex-induced vibration (VIV). One way to reduce VIV is to increase the inherent damping of the riser. Increasing damping of a metal riser is difficult to achieve because of its relative high stiffness/rigidity. Inclusion of compliant bushings at the interface between joints of pipe is one possible technique, but is inappropriate for welded risers. In the past, a common way to reduce VIV has been to disrupt fluid flow around the long slender riser by including helical strakes, fairings, or various shroud arrangements about the riser. Such devices are called vortex suppression devices, and are usually installed in the top 500 to 1000 feet (152.4-304.8 m) of the riser.

The present invention contemplates use of the fatigue monitoring system with such vortex suppression devices, where perhaps a channel or groove for the cabling is provided under the helical strakes or under the fairings. The two systems can be combined, ensuring VIV suppression optimal performance and the security of the optical fiber. For example, one of the helical straights can have a section cut out, allowing the ¼ inch (0.635 cm) optical cable to be pushed into the cutout section. The optical cable will then vertically route up the riser, being held in place while allowing VIV suppression.

The above-described invention will be more specifically exemplified by the following examples that are introduced to illustrate further the novelty and utility of the present invention but not with the intention of unduly limiting the same. More specifically, the following examples describe some of the research, testing, and evaluation efforts made in developing the optical fiber fatigue monitoring system of the present invention.

EXAMPLES

A. Testing of Fiber Optic Sensors

Two types of optical strain sensors were considered for the fatigue monitoring system of the present invention: Optical Time Domain Reflectometer (OTDR) sensors and Fiber Bragg Grating (FBG) sensors. Both sensors are "within" optical fibers and interrogate returned light to give a strain value. OTDR's record strain along the entire length of the optical fiber. FBG's record strains over a particular length, typically ½ inch (1.27 cm), requiring numerous sensors to cover the riser.

1. Optical Time Domain Reflectometer (OTDR) Sensor

An OTDR would allow continuous strain measurement along the length of the riser, avoiding critical fatigue points being missed. Each connection and section of pipe would have a stress-strain history, allowing an assessment of fatigue.

The OTDR analyzes back-scattered light. As light passes through the fiber, some light is lost by passing outside the fiber or by being reflected in the opposite direction to the movement of light. This backward reflection of light within an optical fiber is called backscatter. As the optical fiber undergoes a strain, a greater proportion of the light is back scattered. This backscatter is measured and converted to a strain.

Tests were conducted to assess the OTDR's suitability for the fatigue monitoring system. Approximately 3000 feet (0.914 km) of single mode optical fiber in a Kevlar-reinforced PVC jacket was laid in a large-radius curve at Ellington Field in Pasadena, Tex. An OTDR that interrogates the optical fiber with light having wave lengths on the order of 1300-1500 nano-meters was used. The cable was bent into successively smaller radius curves, from a radius of 50 feet (15.24 m) to a final radius of 0.5 inch (1.27 cm). The reduced radius resulted in an increased strain on the optical fiber. While the cable was bent, the OTDR strain monitoring equipment was observed.

The OTDR failed to record strains in the fiber while the test radius was reduced. When the fiber was bent close to breaking point, a reflected signal was recorded. Beyond the tight bend, no readings could be taken. When the tight bend was released, the signal measured by the OTDR returned to zero.

It is concluded that with the present OTDR technology and optical fiber, the sensor is not sufficiently sensitive to record the strains required by the fatigue monitoring system. An optical fiber that allowed greater backscatter could provide sufficient strain data for the fatigue monitoring system. A greater backscatter optical fiber was not commercially available at the time of testing, although it is believed that this technology will be developed in the next few years.

2. Fiber Bragg Grating (FBG) Sensor

Fiber Bragg Grating (FBG) sensors record strains at specific points in the optical fiber. Small grooves are cut on the surface of the fiber that make a sensor that is about ½ inch in length. When a strain is applied to the sensor, the frequency of light passing through the sensor is shifted. The shift in frequency is proportional to the applied strain, the light can be interrogated, and the strain on the sensor calculated. Each sensor is sensitive to a particular frequency band. Multiplexing assigns sensors different frequencies allowing several sensors to be placed on each fiber. Using multiplexing and multiple optical fibers, hundreds of sensors can be used in each system to record near continuous strain measurement along the riser.

To test the FBG sensor it was adhered to a pipe. A load was applied to the pipe and the pipe and sensor underwent a strain. While the pipe was loaded and unloaded the strain values were recorded.

Figure 7:
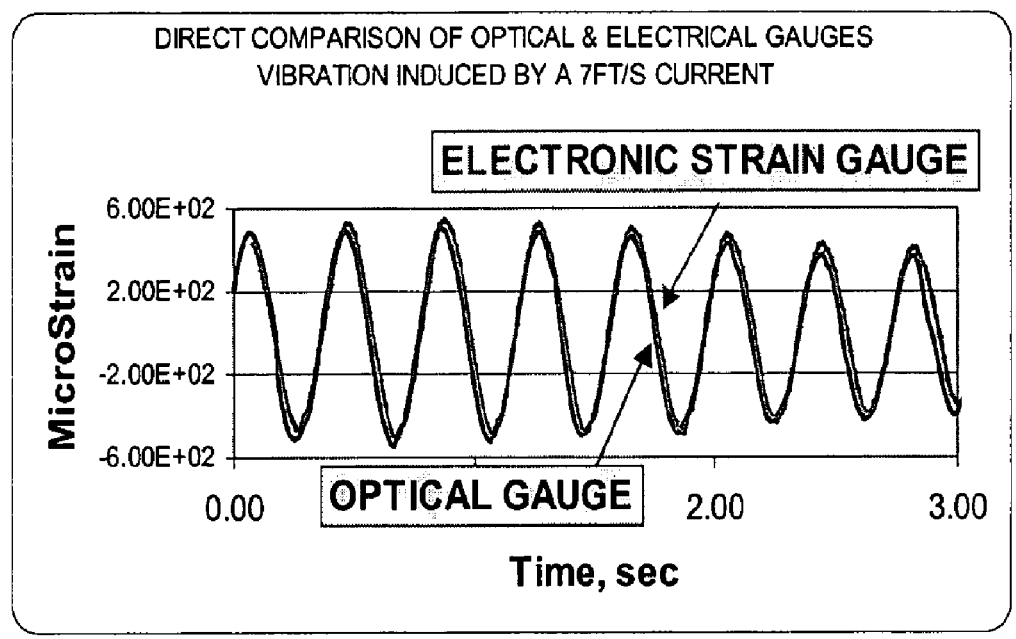
FIG. 7 shows the result of a comparative test of FBG and electrical strain gauges.

Previously a comparative test of FBG and electrical strain gauges was undertaken. The results proved the FBG was at least as accurate and precise as the electrical strain gauge. The test is presented in FIG. 7.

The strains recorded by the FBG sensor had a strong correlation to the single point bending moment calculations. As rapid loads were applied to the pipe, the strain-measuring device reacted quickly and recorded the strain correctly. In the comparative test with the electrical strain gauge, the FBG proved it was a reliable sensor.

It is concluded that the FBG sensors have the accuracy, precision, and responsiveness required by the fatigue monitoring system. Using multiplexing and multiple optical fibers, sufficient sensors can be placed on the pipe to give accurate measurements of riser strains. The sensors recorded the data real time allowing stress-strain cycles to be recorded. The sensors are suitable for use in the fatigue monitoring system.

B. Testing of Fatigue Monitoring Concepts

To prove concepts and assess the performance of the fatigue monitoring system three series of tests was conducted. Each series was conducted at a particular stage in the development of the system, subsequent series of tests building on the results of the previous. Within each series several sets of tests were conducted to evaluate different concepts.

1. First Series of Testing

The first series of tests was subdivided into three sets of tests. The first set, tested the "piggyback" concept. The piggyback concept uses a pipe instrumented with strain sensors, which is strapped to an existing steel catenary riser (SCR). The straps provide sufficient force for the SCR and the piggyback pipe to act as a composite section. Strains are recorded on the piggyback pipe allowing the amplitude and the number of stress-strains cycles of the SCR to be calculated. This provides sufficient data to calculate the fatigue of the SCR. The second and third tests assessed the suitability of ABS plastic and Fiberglass to model SCR's in subsequent tests.

Figure 8A:
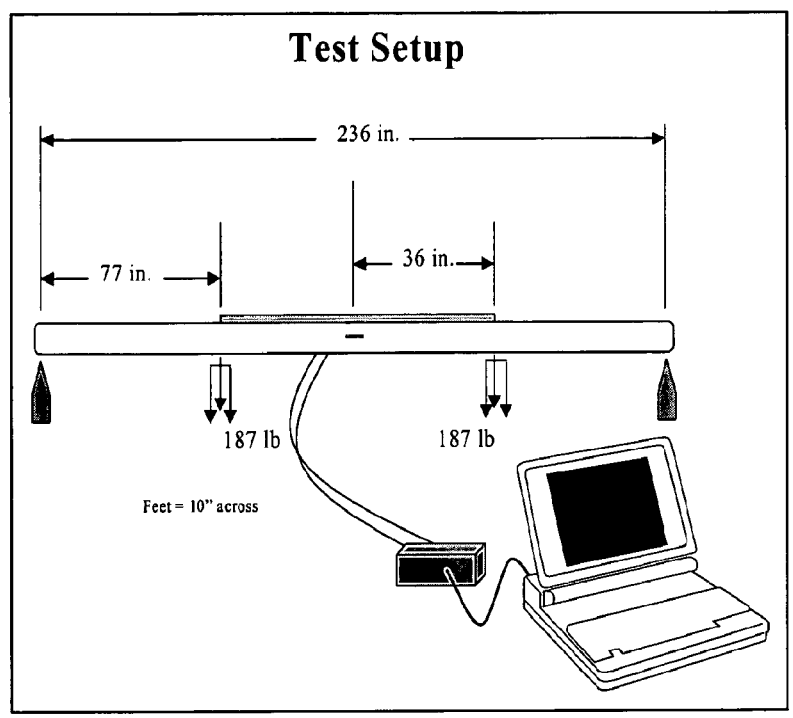
FIG. 8 illustrates the test setup to assess the performance of the fatigue monitoring system using the piggyback concept in the tests numbered SCRFT 1-11.
Figure 8B:
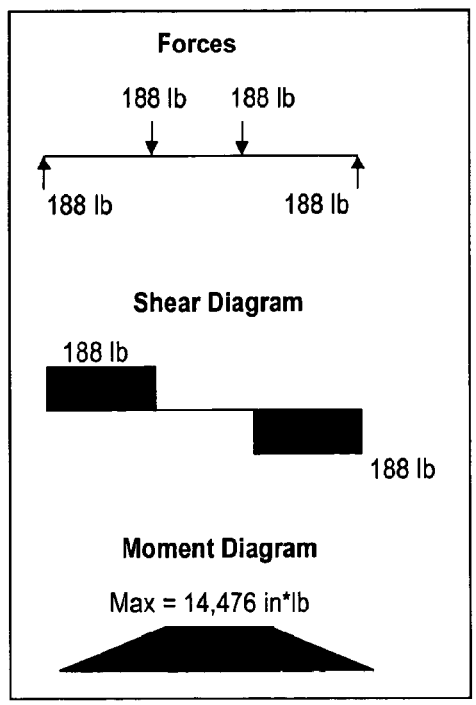

The piggyback concept test used a steel box section piggyback pipe strapped to a 20 ft (6.096 m) steel model SCR. The test setup is shown in FIG. 8. The piggyback pipe and the model SCR were each instrumented with two strain sensors. A two point vertical load was applied to the model SCR, resulting in a deflection and strains on the pipes. Strains on the model SCR and piggyback pipe were recorded. Eleven tests were conducted and are labeled SCRFT 1-11. The loading arrangement was adjusted and the SCR and piggyback pipe were rotated to provide data at different angles. The concept was tested by predicting the strains on the SCR from strains recorded on the piggyback pipe.

For the piggyback concept test, the FBG's were adhered to a steel model SCR pipe. For planned larger scale tests, steel would require an excessive force to cause the required strains, and a more workable material would significantly simplify the process. It was decided to test ABS plastic to assess its suitability to be used in the modeling of an SCR and piggyback pipe. ABS plastic offered several advantages over steel—it is easier to handle and work, requires lower loads for a given strain, and would allow a larger diameter pipe for the large-scale tests.

The principle concern in using ABS plastic was that the material would either behave plastically or undergo creep. Steel does not exhibit either of these behaviors. By comparing the maximum bending stress with the yield strength of the ABS, it was found that the material should not experience plastic behavior. Creep occurs in all plastics to some extent and is the change in length under constant load. To assess the amount of creep ABS pipe would experience, an FBG sensor was epoxied to a 1 inch (2.54 cm) OD ABS pipe. Several loads were applied to the center of the pipe, resulting in a displacement and strain. One hour static loads and loading/unloading cycles were applied to the pipe.

A small amount of creep was experienced for the highest static load over the longest time period. No creep was observed for the loading/unloading cycles.

It is concluded that creep could occur in ABS pipe if subjected to large static strains over prolonged periods. The proposed test procedure was amended to reduce the duration of static loading periods. It was concluded that for the proposed larger scale test the ABS plastic pipe would be suitable. The dynamic loading of the ABS pipe produced no evidence of creep.

Fiberglass was tested to see if it was a suitable material for modeling of an SCR and piggyback pipe. Fiberglass offered several advantages over steel in that it is easier to handle and work, requires lower loads for a given strain, and would allow a larger diameter pipe for the larger scale tests. Fiberglass was thought an alternative to ABS should ABS prove unsuitable. By centrally loading a fiberglass pipe, strains were induced. The pipe was statically loaded for an hour and loaded/unloaded in 1-minute cycles. No creep was observed.

The piggyback concept test provided sufficient data to compare the piggyback strains to the model SCR strains. The strains from the piggyback pipe under predicted the strains on the model SCR pipe. Movement between the piggyback pipe and the model SCR resulted in the pipes not acting as a composite section. The force resisting independent movement of the two pipes was insufficient. The force of the straps holding the piggyback pipe to the model SCR should be increased. Further testing should be undertaken to assess the most appropriate method for securing the piggyback pipe.

It was concluded that ABS plastic would be suitable for the large-scale SCR test as it would behave elastically under the load conditions, be an easily workable material, allow the pipe to be 2½-inch (6.35 cm) OD, and would not experience creep due to the dynamic loading of the test. Fiberglass offered no advantages over the ABS plastic.

2. Second Series of Testing

The second series of tests evaluated the strapping mechanism of the piggyback pipe. Several tests were conducted with the strapping mechanism and the pipe orientation being adjusted. A separate set of tests was conducted with the piggyback sensor below the SCR, to examine the effect of the piggyback pipe in tension.

Figure 9A:
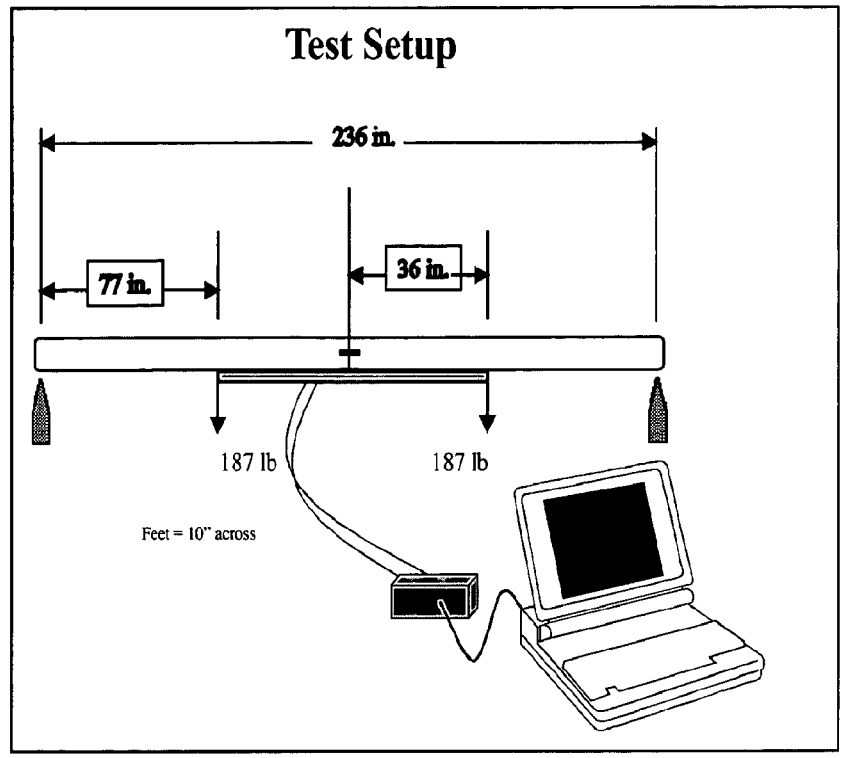
FIG. 9 illustrates the test setup for evaluating the strapping mechanism of the piggyback pipe in the rotation and strap tests numbered SCRFT 12-31.
Figure 9B:
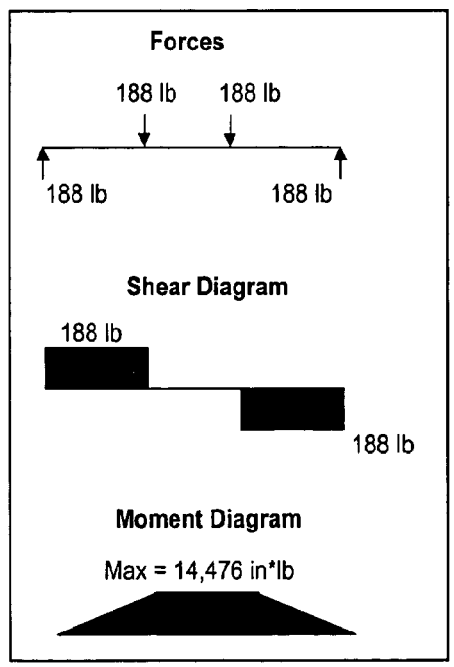

The rotation and strap tests were a continuation of the piggyback concept tests conducted in the first series, and used the same 20 foot (6.096 m) steep pipe and box section steel piggyback pipe. Two strain sensors were located on the model SCR pipe and two sensors on the piggyback pipe. A two point vertical load was applied to the model SCR, resulting in a deflection and strains on the pipe. The test setup is shown in FIG. 9. The strapping arrangement was adjusted to:

Determine the most effective method of attaching the piggyback box section to the model SCR pipe.

Test the calculation of strains in the SCR based on the piggyback pipe data.

The pipe and piggyback box section were rotated to test:

The systems ability to determine principle strain direction.

The systems ability to determine magnitude of principal strain.

The effect of the piggyback pipe on the centroidal moment of area, and whether the two pipes would act as a composite section.

Figure 10:
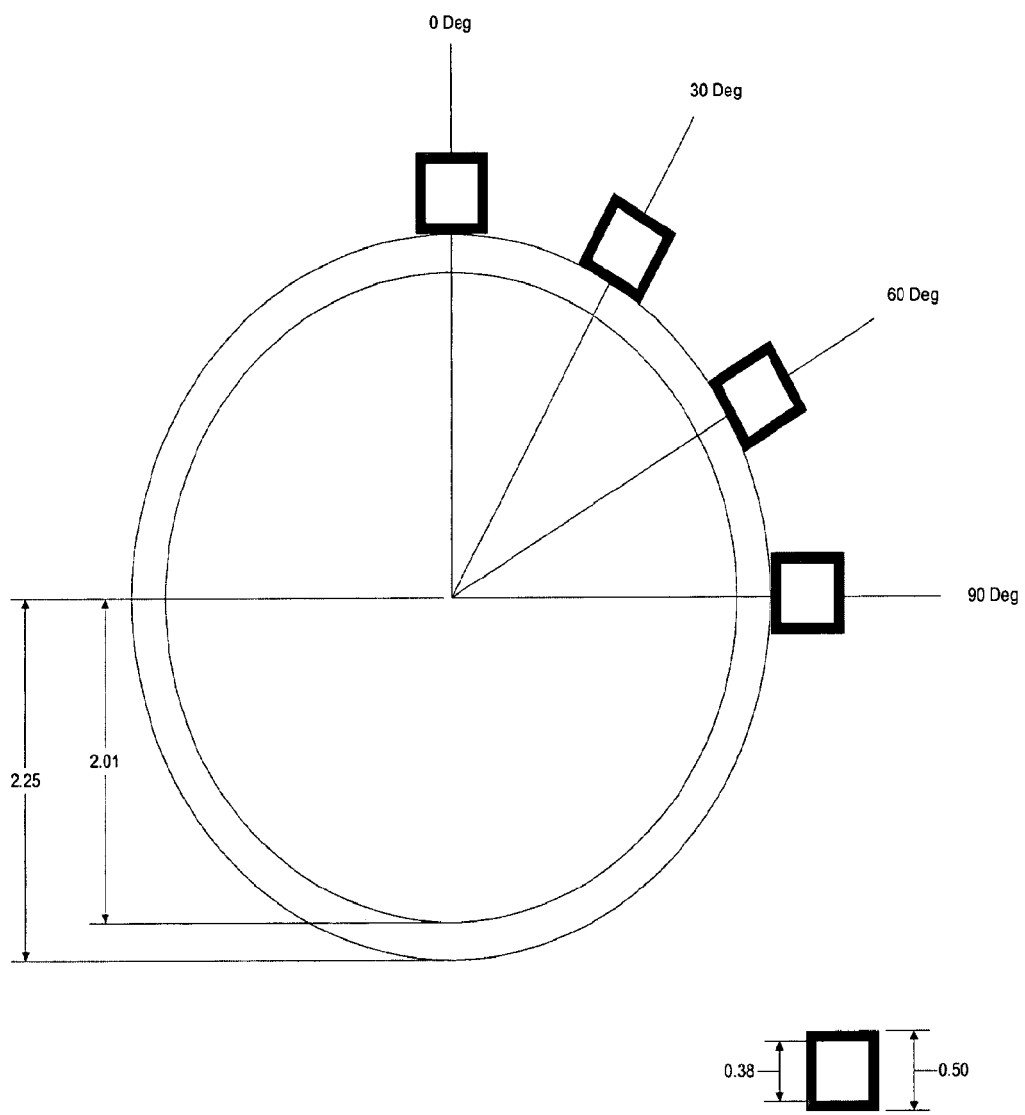
FIG. 10 shows the rotation of the pipe in the series of rotation and clamping tests numbered SCRFT 12-31.

The rotation of the pipe is shown in FIG. 10. The angle of rotation was measured from the vertical position. The series of rotation and clamping tests were numbered SCRFT 12 to SCRFT 31.

Figure 11:
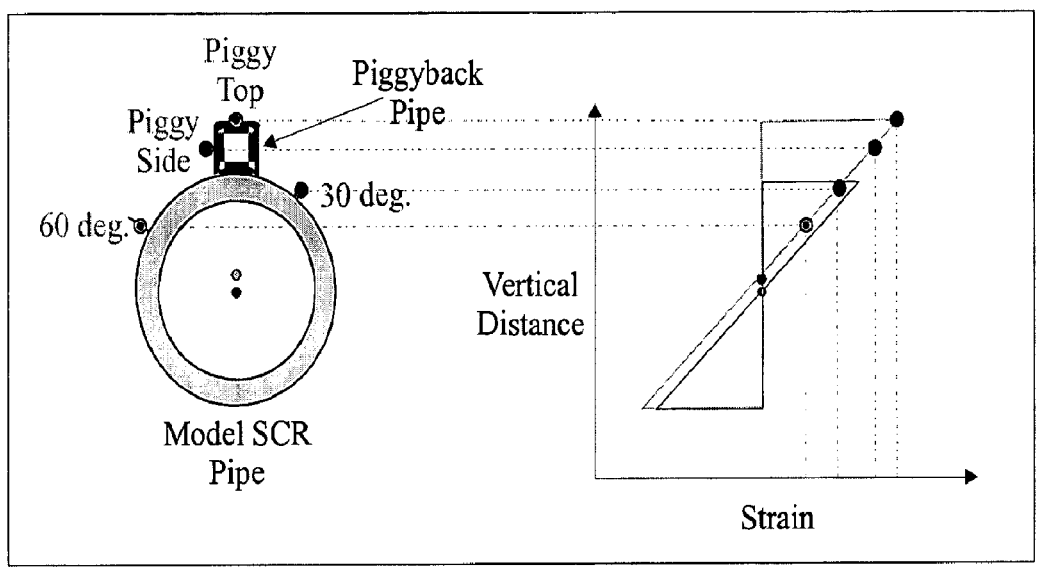
FIG. 11 shows the location of the sensors on the steel model SCR and piggyback pipe.

FIG. 11 shows the location of the sensors on the 20-foot steel model SCR and piggyback pipe. The distance from centroid and the strain induced is also shown. When a composite section is bent, the distance from the centroid to an element is proportional to the strain in that element. The centroid will undergo no strain while the point furthest from the centroid in the direction of bending will undergo the greatest. The red, brown, blue, and green dots are FBG strain sensors. The black dot is the centroidal moment of area of the Model SCR pipe; the orange dot is the centroidal moment of area of the composite Model SCR and piggyback pipe. The dashed lines relate the sensor location to the strain induced. The addition of the piggyback pipe results in the centroid moving up and stiffening the pipe section, and results in the strain diagram shifting from black to orange.

The green and blue sensors are located directly on the steel pipe. The red and brown sensors are located on the piggyback pipe. Because the piggyback sensors are further from the centroid, the strains should be greater.

Figure 12:
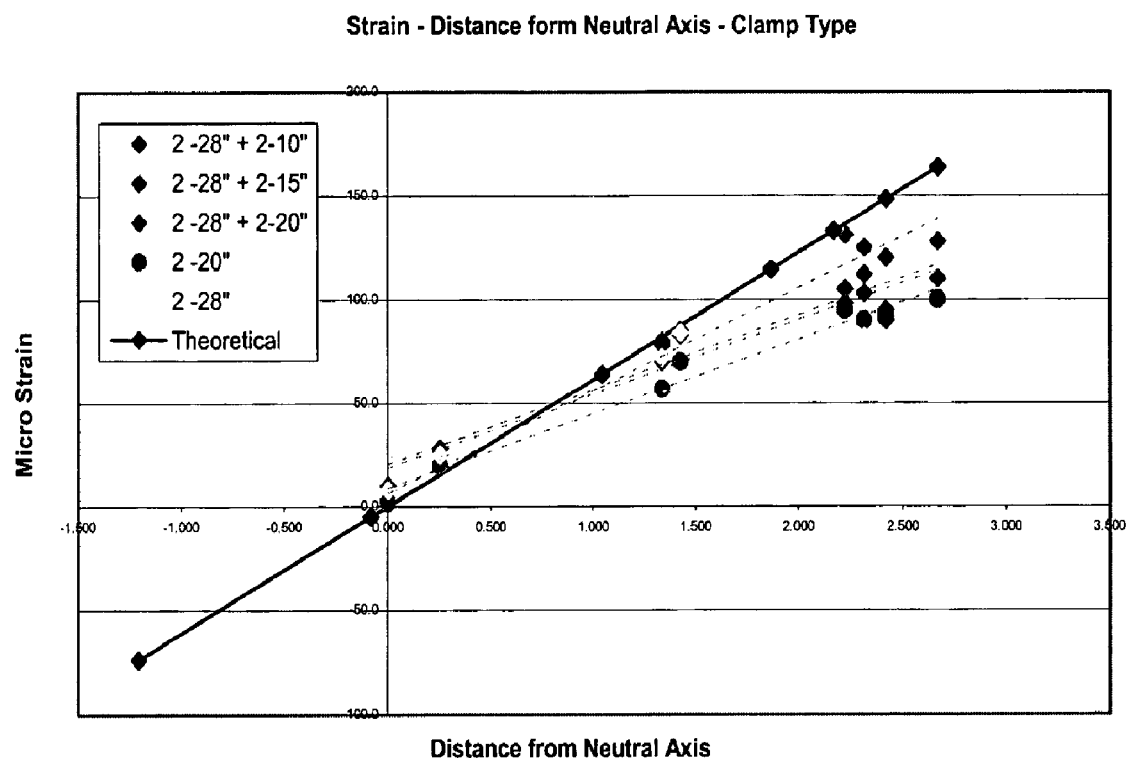
FIG. 12 plots the piggyback strains against the distance of the sensor from the composite section centroid.

FIG. 12 plots the piggyback strains against the distance of the sensor from the composite section centroid. The theoretical values are in black, the straight line indicating that the strain is proportional to the distance from the centroid. If the test values matched the theoretical values, the strains of the piggyback pipe could be used to determine the strain on the SCR. The types of straps used are shown in color. It can be seen that the strapping type affected the strain values recorded. The most successful strap arrangement is shown in brown and measured about 90% of the theoretical values. It was concluded that the piggyback and model SCR pipes were still not acting as a composite pipe although the addition of extra straps improved the value of strain recorded.

Figure 13:
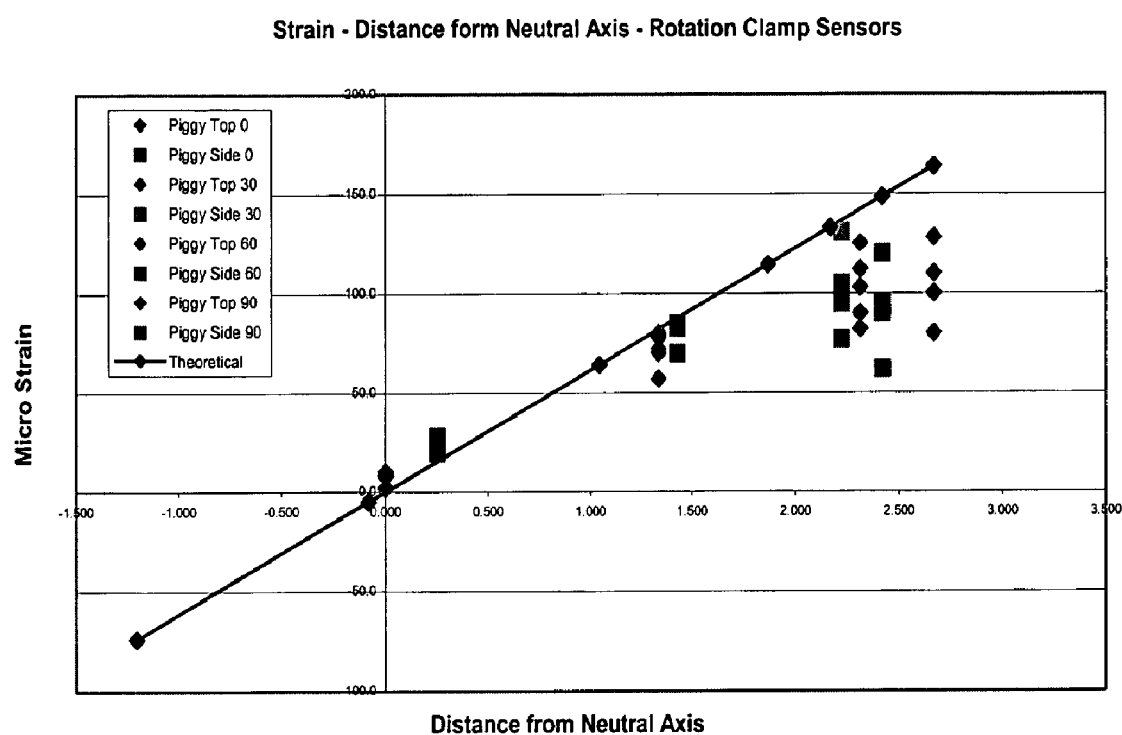
FIG. 13 shows the recorded strains on the piggyback pipe as the pipe is rotated through 90°.

FIG. 13 shows the recorded strains on the piggyback pipe as the pipe is rotated through 90°. The theoretical values are shown in black and are calculated as if the two pipes act as a composite section. At angles close to the horizontal (piggy 60 and piggy 90) the strains are close to the theoretical. The strains are relatively low and the force that the straps are resisting is less. It is concluded that the straps can resist the force to move the pipes independently and allow the piggyback strains to accurately predict the model SCR strains.

For angles closer to the vertical position, the strains and the forces acting to move the two pipes independently are greater. The restraining force provided by the straps is exceeded and the pipes do not act as a composite section.

At 0° to 30° (blue and red dots) the recorded strains are similar. Theoretically, the 0° (blue) strains should be greater as the sensor is located further from the centroid. It is concluded that the independent movement force exceeded the maximum restraining force at 30° from vertical (red dots). Additional strain applied to the model SCR will not be transferred to the piggyback pipe. In this test, the force resisting independent movement was insufficient to provide a reliable composite section at all rotation angles.

Figure 14:
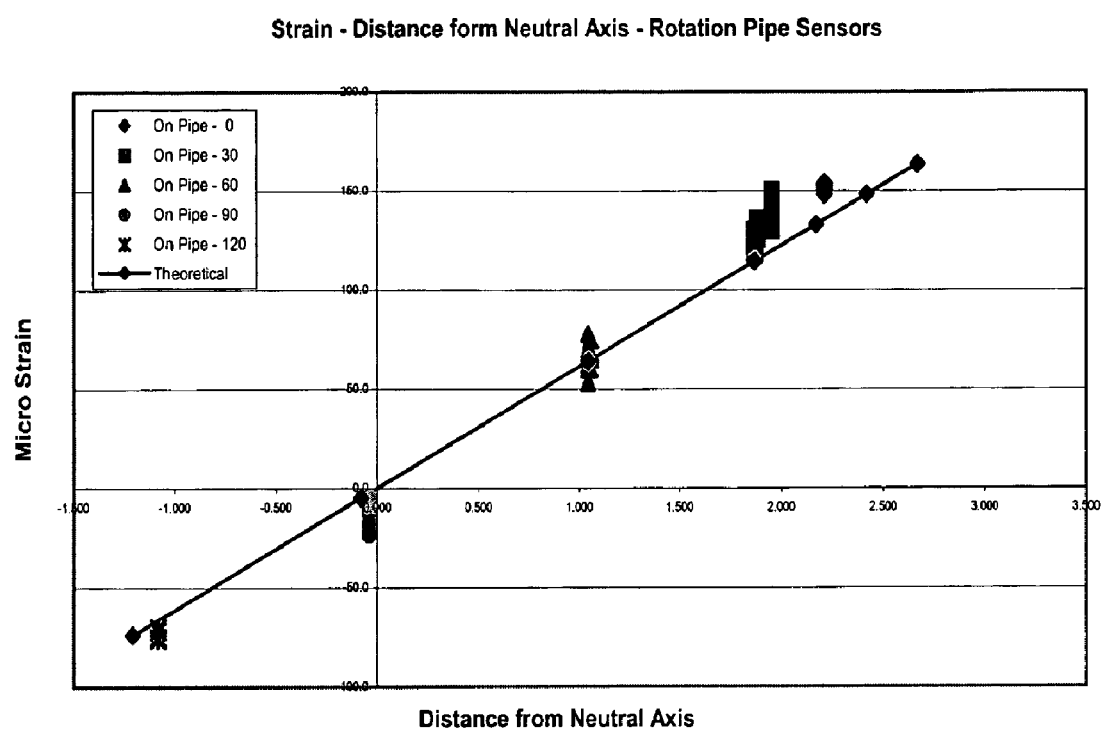
FIG. 14 shows the strains measured from the sensors epoxied directly to the pipe.

FIG. 14 shows the strains measured from the sensors epoxied directly to the pipe. It can be seen that the strain values recorded for 60, 90, and 120° correlate well with the theoretical values. This indicates that the pipe is behaving as a composite section.

The sensors at 0 and 30° from vertical (blue and red) produce slightly higher strains than the composite sections theoretical values. The values are greater because the two pipes are not acting as a composite section. The distance from the 0 and 30° sensors is slightly greater to the SCR centroid that the composite section centroid. When the SCR is acting independently, the recorded strains show a corresponding small increase.

Figure 15:
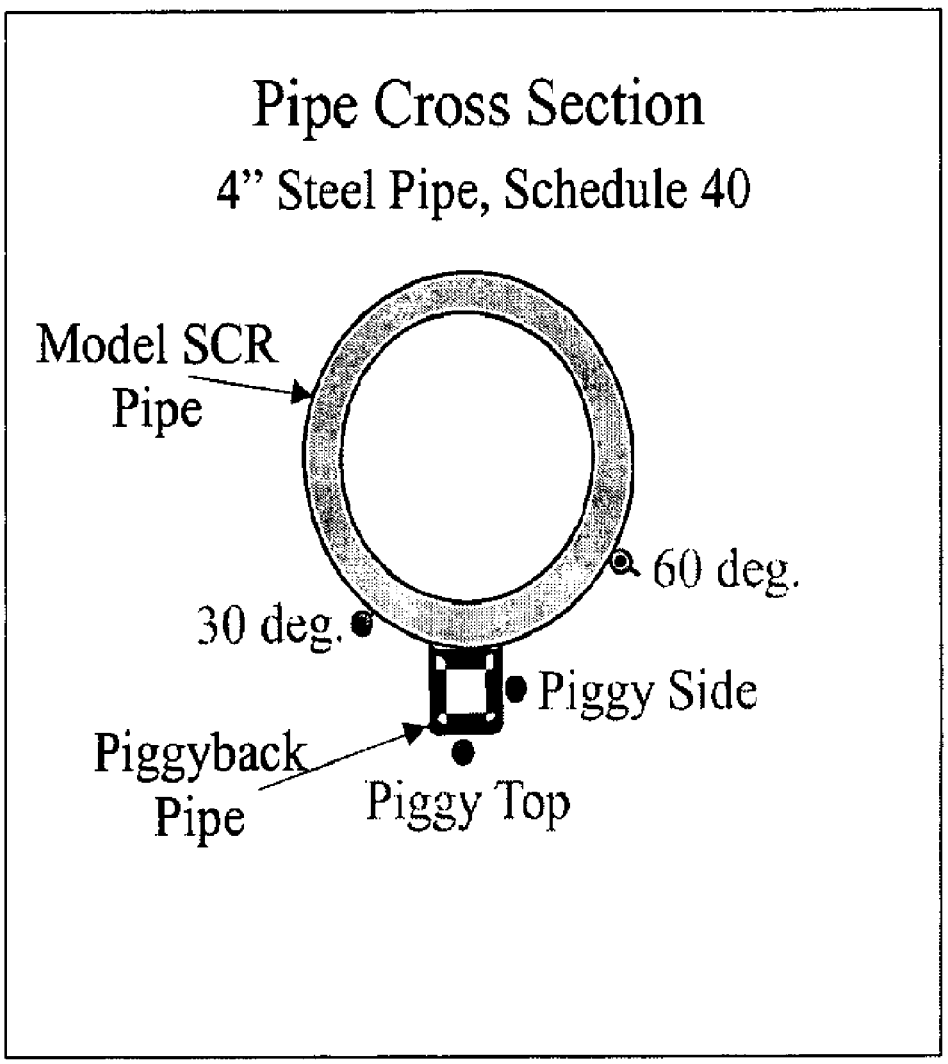
FIG. 15 depicts the location of the sensors in tension tests numbered SCRFT 32-35.

To test the piggyback system under tensional conditions, the model SCR pipe and the piggyback pipe were rotated so that the piggyback pipe was vertically below the model SCR. A two-point load was applied to the pipe and the model SCR deflected. The tension tests were numbered SCRFT 32 to SCRFT 35. The sensors were located as shown in FIG. 15.

Figure 16:
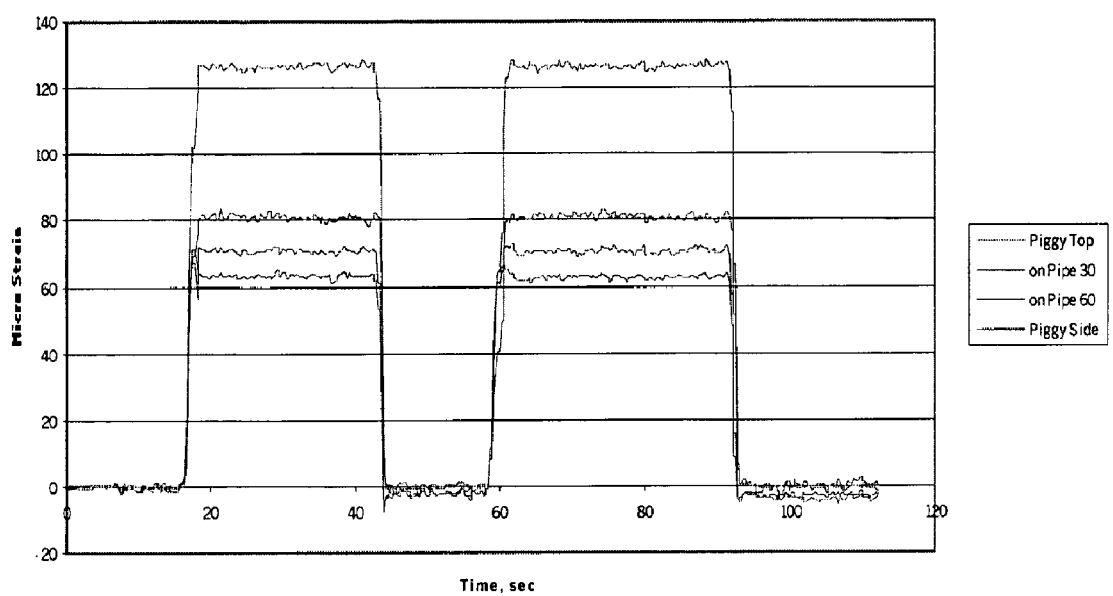
FIG. 16 shows the SCR and piggyback strains during the SCRFT 33 test.

FIG. 16 shows the SCR and Piggyback strains during the SCRFT 33 test. When the load is applied/removed, the piggyback and SCR sensors respond together. Strong agreement for the loading/unloading cycles allows the fatigue cycles to be easily recorded. Similar results were experienced for the clamp rotation tests, but with compressive negative strains.

Figure 17:
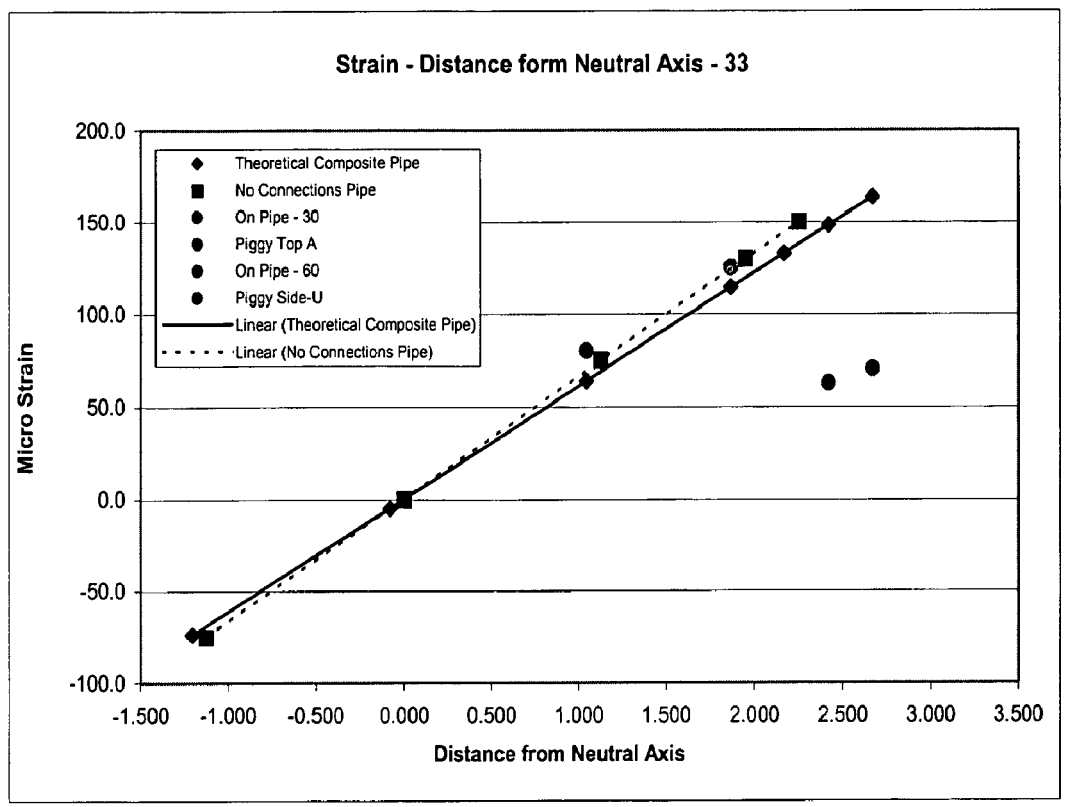
FIG. 17 plots the strains against the distance from the centroidal moment of area.

The strain amplitude is required to successfully calculate the fatigue in the SCR. In FIG. 17, the strains are plotted against the distance from the centroidal moment of area. The piggyback strains (red and brown) are less than the composite section theoretical values. Using the piggyback strains to predict the SCR strains would underestimate the amplitude of the fatigue cycles. These results are similar to the results obtained when the piggyback pipe was in compression.

It is concluded that the force resisting the independent movement of the piggyback and model SCR pipes is insufficient to result in a composite section. When the piggyback pipe is rotated to angles closer to the horizontal, the strains decrease and the strap provides sufficient force for the pipes to act as a composite section. The piggyback concept is proved, although a greater strapping force is required to maintain a composite section at all angles of rotation.

3. Third Series of Testing

Following the completion of the second series of tests, additional work on the forces resisting independent movement of the piggyback pipe was performed. Finite element analysis of the tests evaluated the theoretical limit where the resisting force should be sufficient.

In addition, three new concepts were developed for the piggyback sensors;

A clamp would replace the piggyback pipe. The sensors would be located on the clamp; the clamp would be secured to the SCR by a screw thread. The screw thread would allow a greater clamping force to be applied to the pipe. The clamp has the advantage of acting on both tensional and compressional parts of the pipe.

The piggyback pipe or clamp could be adhered to the SCR by a sub-sea epoxy. The sensors epoxied to the model SCR provided very reliable and accurate date, the epoxy would ensure a composite section.

The piggyback pipe could be offset from the SCR. If 100% of the theoretical strains are not obtainable on the piggyback pipe with straps, the force could be reduced to zero and the strains calculated from the new known conditions.

Finite element calculation concluded that the strap design could not provide sufficient force to prevent the piggyback pipe from sliding. The piggyback strains are significantly less than the theoretical values, even with a small movement of the piggyback pipe.

Figure 18:
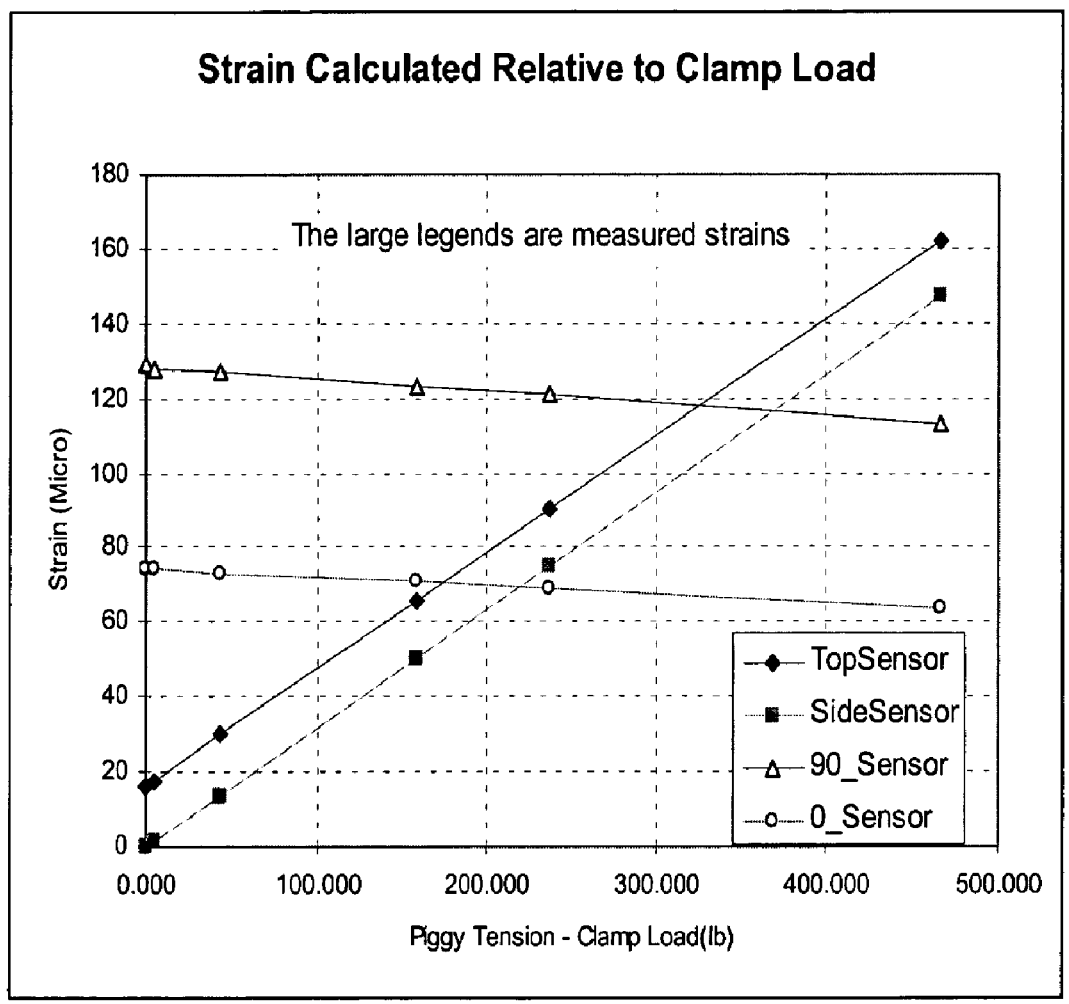
FIG. 18 shows the strain values recorded with the increase in clamp force.

FIG. 18 shows the strain values recorded with the increase in clamp force. A clamp force of about 460 lbs. (208.65 kg) results in a composite section. The piggyback strains increase from zero at no clamp strains to their theoretical values when a composite section is achieved. The second series rotation and strap test results indicate that a clamp force of about 160 lbs. (72.57 kg) was achieved. The calculations agree with the tests results and define the required force to achieve a composite section.

It was concluded that using additional straps might not guarantee that the piggyback pipe will act as a composite section. Additional calculations were conducted on a solid clamp, and concluded that it would be strong enough to hold the SCR without movement. It was decided to construct a solid clamp for use in the large-scale tests.

Two tests were conducted; the first examined the epoxied clamp or plate, the second examined the offset piggyback pipe. The epoxied clamp was model using ABS plastic. A section of ABS pipe was epoxied to an ABS model SCR. Loads were applied to the pipe as in previous tests and the strains recorded. The strains on the epoxied clamp allowed the strains in the SCR to be accurately predicted. This provided additional evidence supporting the piggyback concept.

The concept of an offset piggyback pipe allows the piggyback pipe to bend to the same radius of curvature as the SCR. The strain values recorded on the offset piggyback pipe could be used to calculate the strains on the SCR. The sensor device would attach to the SCR by two clamps, one at either end of the offset piggyback pipe. The offset piggyback pipe would not come into contact with the SCR.

The sensor on the offset piggyback pipe recorded a strain greater than the SCR. As the SCR was deflected, the clamps moved inward, resulting in a greater compressional strain on the offset pipe. The test gave results similar to those anticipated. Detail analysis of these results was not completed as it was decided to progress with the clamp and epoxied methods.

For the piggyback concept to work successfully, the piggyback pipe and the SCR need to be a composite section. The strap or clamp force needs to be sufficient to prevent independent movement of the two pipes. In tests SCRFT 12-31, the strap force was insufficient to resist movement at the higher strains. In calculations, a clamp would provide greater resistance and allow the piggyback concept to work.

The piggyback concept works equally well in compression and tension. A curved plate epoxied to the SCR would provide sufficient data to allow fatigue monitoring of the SCR. In tests SCRFT 32-35, the restraining forces resisting independent movement of the two pipes was insufficient to prevent movement.

C. Scale Model Testing

On completion of the concept testing, a scale model test of the SCR system was performed. An ABS pipe was suspended from the 30 ft. (9.14 m) high wave tank tower and hung in a catenary shape. FBG sensors were attached to the ABS pipe. To simulate vessel heave, a computerized ram dynamically agitated the pipe. The strains in the touchdown zone (TDZ) were recorded. The test was conducted to assess the system's ability to count stress-strain cycles, to evaluate how well the system identified the touchdown point (TDP), and to evaluate the accuracy of strain measurement.

The scale model test objectives were to:

Model the SCR to test the fatigue monitoring system before deployment,

Evaluate the system's ability to locate and monitor the TDP,

Evaluate the system's ability to count stress-strain cycles,

Evaluate the clamping system's accuracy in measurement of recorded strain,

Allow the distance between the sensors for the field system to be assessed,

Test the computer program for operational errors, presentation of results, and recording of data, To acquire realistic test data, Allow dynamic strains to be measured, and Use an increased number of sensors to test the data acquisition system.

Figure 20:
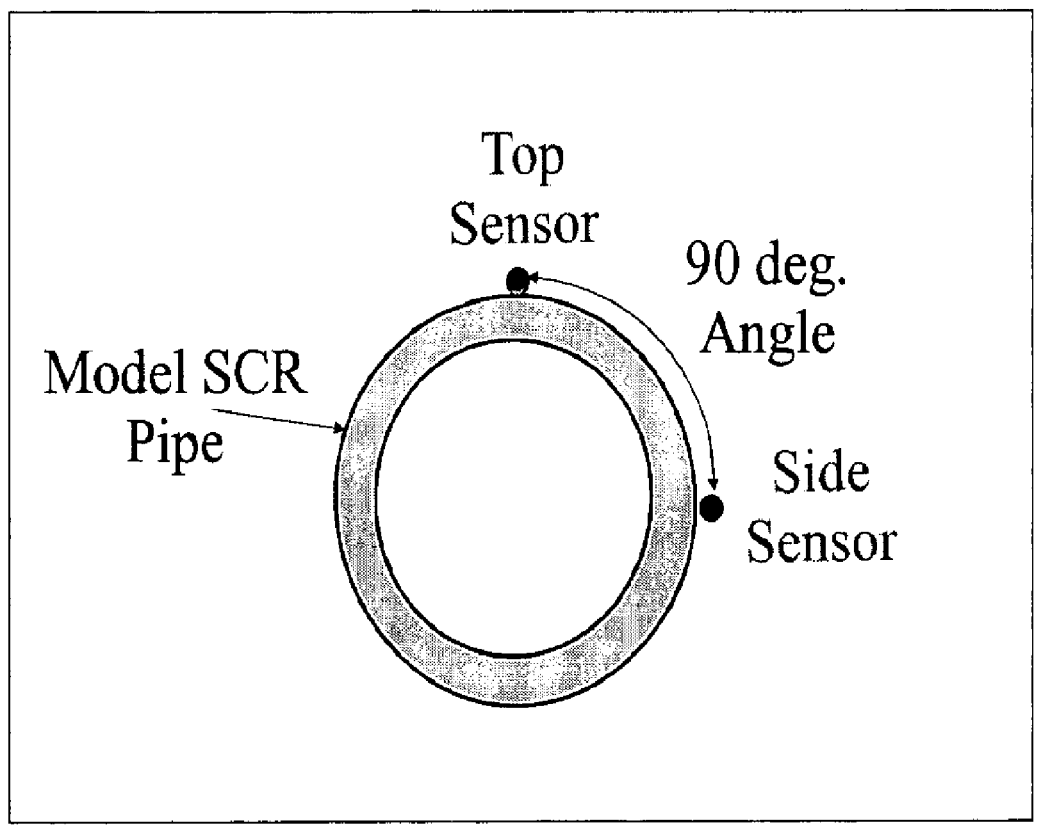
FIG. 20 shows the setup at each station in the scale model test.
Figure 21:
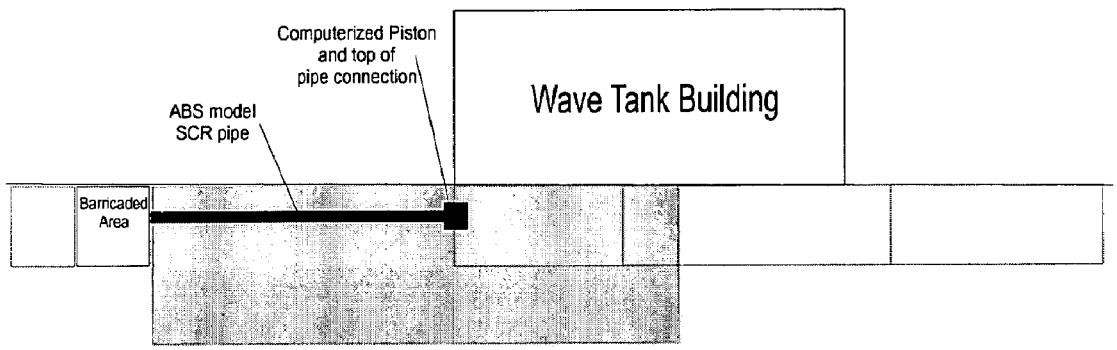
FIG. 21 depicts the detailed site plan for the scale model test.
Figure 21:
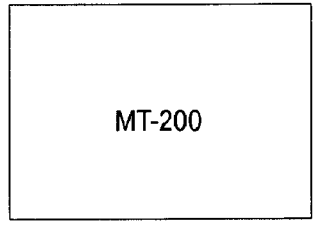
Figure 21:
Figure 21:
Figure 21:

The test setup is as follows. A 90-foot length of ABS pipe was hung from the 30 foot (9.14 m) high wave tank tower. The pipe formed a catenary shape under its own weight. The TDP and pipe end were approximately 25-feet (7.62 m) and 60-feet (18.28 m) from the tower. The test setup and station locations are shown in FIG. 19, the locations at each station are shown in FIG. 20, and the detailed site plan is shown in FIG. 21.

Sensor Location and Installation

Figure 19:
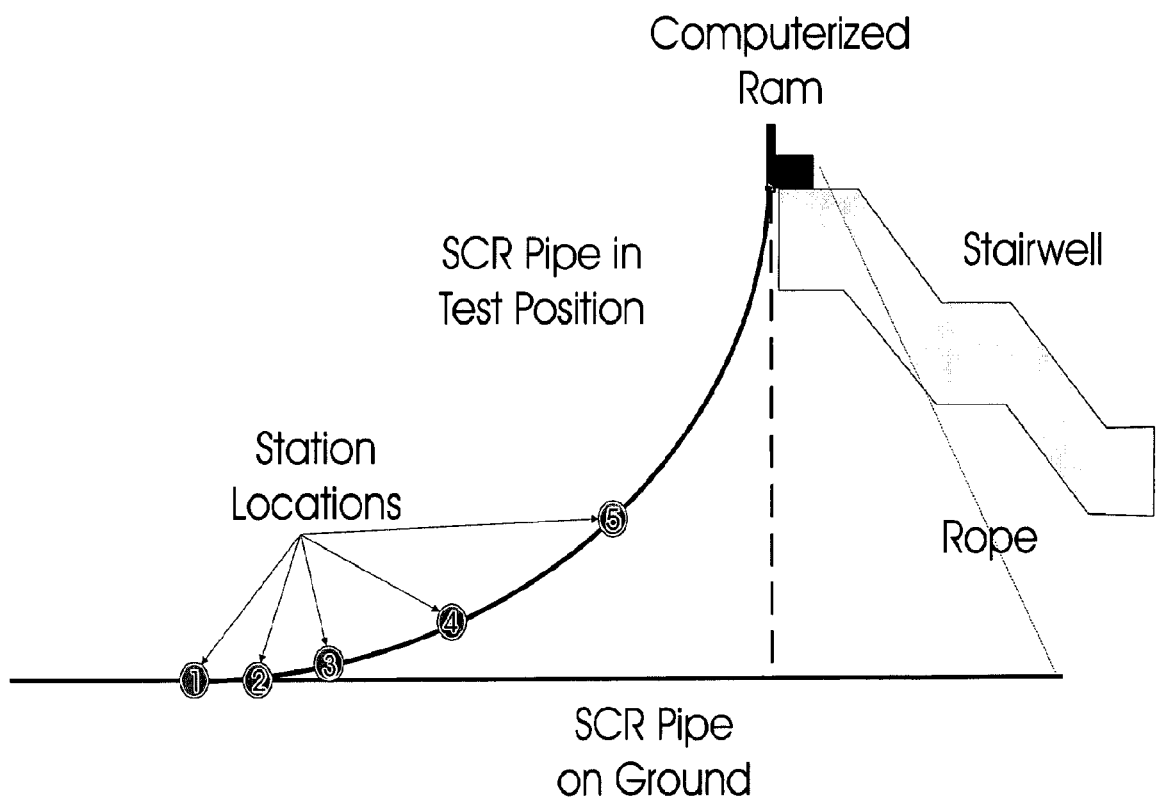
FIG. 19 shows the test setup and station locations in the scale model test of the SCR system.

The strain sensors were adhered to the ABS model SCR pipe at 5 stations along the pipe, shown on FIG. 19. A station was defined as a location along the pipe where the strains would be monitored. Several sensors would be placed on the circumference of the pipe at each station location. For initial tests, two sensors at 90° were placed at each station location. Additional third and fourth sensors at each station were later added. The additional sensors allowed the SCR strain components to be differentiated. Tension, bending moment and principle strain direction can be resolved with four circumferential sensor locations.

The Model SCR pipe was suspended in the test position. The range of motion of the TDP was marked. It was decided to locate five stations around the TDP. The locations are given below relative to average TDP position:

| Station Number | Location |
| --- | --- |
| 1 | 9-ft (2.74 m) in front of TDP (location of maximum curvature) |
| 2 | 3-ft (0.914 m) in front of TDP |
| 3 | 1-ft (0.305 m) in front of TDP |
| 4 | TDP location |
| 5 | 1-ft (0.305 behind TDP |

These locations were chosen to ensure:

The maximum strain changes observed at the TDP will be recorded,

The movement of the TDP will be observed,

The highest static strains will be observed,

At a later date strains due to lateral movement may be obtained.

The sensor locations were verified and the surface abraded. The optical sensors were fixed to the pipe by an epoxy adhesive. The optical sensors and the main optical fiber cable were fused once the epoxy hardened.

The SCR pipe was displaced vertically by the computerized hydraulic ram. The ram moved 1 foot (0.305 m) at an angle 10° from vertical. This displacement simulates the vessel heave and causes the SCR TDP to move along the pipe. The strains along the pipe changed dynamically and were recorded by the fiber optical sensors system.

The test setup allows the computerized ram to be rotated about 90°, giving a lateral displacement. The ram will displace the model SCR pipe 6 inches (0.153 m) in the horizontal direction. The movement is limited to 6 inches (0.153 m) in order to minimize the sideways moment on the ram. The system's ability to monitor these conditions will be assessed.

The following summarizes the results of the scale model testing. The method and results of the strain cycle counting and the strain principle direction and magnitude are explained and assessed.

The model SCR is believed to be a realistic test platform for the system. The ABS pipe behaved as anticipated and no material problems were observed.

The TDP can be found by analyzing the strain data. At the time of the test, the computer display was not completed. It is planned to display the riser showing the TDP in relation to the sensor locations.

The clamp strains allowed the direction of the principle strain to be calculated.

The stress-strain cycles of the clamp matched those of the SCR pipe.

The clamp was unsuccessful at predicting the magnitude of the strains on the SCR. This resulted from the strain on the pipe being significantly greater than the ATI tests. The forces to cause a composite section for ABS are considerably greater than steel. The clamp did not achieve a composite section with the ABS pipe.

The 1 to 2 feet (0.305-0.610 m) between the station locations was sufficient to see the movement of the TDP. In scaling up the system for field deployment, a distance of between 5 to 10 feet (1.524-3.048 m) should be sufficient to observe the movement of the TDP.

The SCR fatigue/strain computer display program was not checked, as it was not complete at the time of the tests.

The systems recorded dynamic strains well. The strains sensors responded quickly and accurately to the simulated vessel heave.

The number of sensors installed was significantly increased from the earlier tests. The increased quantity of data provided no additional problems for the black box and light interrogation software.

The strain values the computer receives have low amplitude noise. This noise resulted in the rain flow counting software counting additional half cycles at reduced amplitude. To correctly record the stress-strain half cycles, a frequency filter was applied to the raw data; this prevented half cycles from being counted incorrectly.

An important aspect of the fatigue monitoring system is the ability to count the stress-strain cycles that cause fatigue. The dynamic movements in the scale model test resulted in dynamic strains in the SCR. These dynamic strains allowed the strain cycles to be counted. The proposed method of counting the stress-strain cycles looks for reversals in the data. A reversal is the local maximum of minimum, and results when the trend changes from increasing values to decreasing values, or decreasing to increasing.

The test data had low amplitude noise. This noise resulted in the program counting additional low amplitude half cycles. A frequency filter was applied to the raw data preventing erroneous data from affecting the count. Filtering the data allowed the correct number of cycles to be counted.

Figure 22:
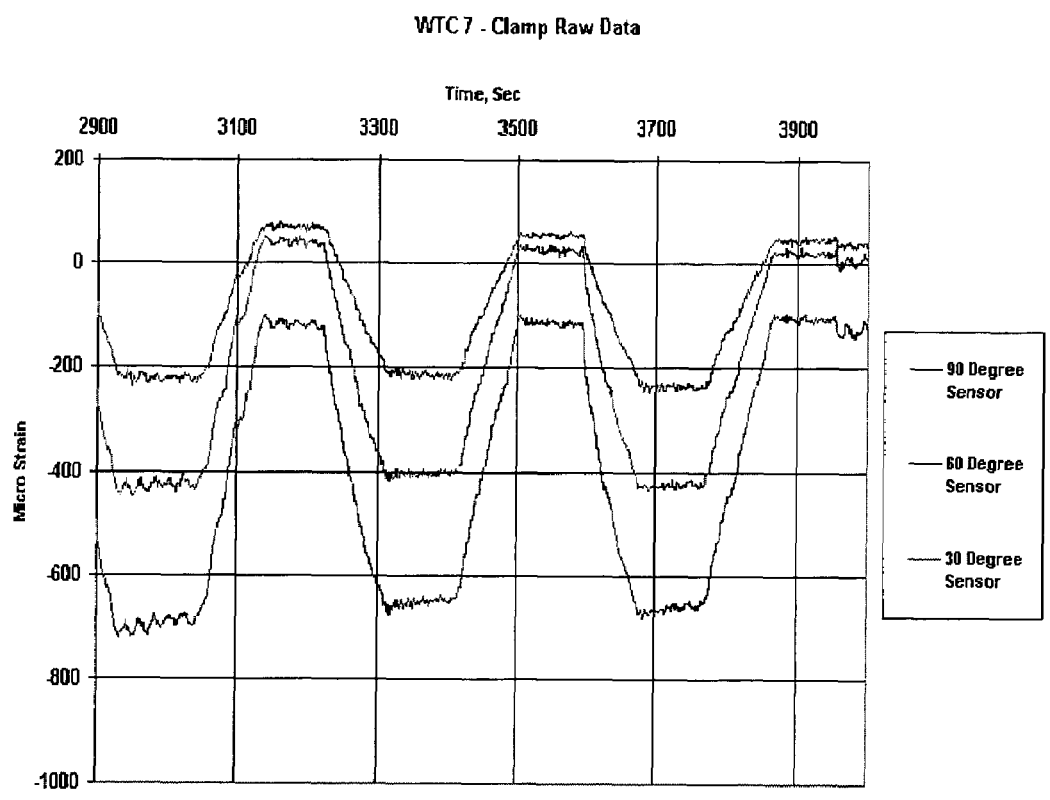
FIG. 22 shows the raw strain data recorded during the scale model test.

FIG. 22 shows the raw strain data recorded during the scale model test. The model SCR pipe was raised 1 foot and returned to its original position over a ten second period. The displacement was of a constant velocity and paused at its full range of motion. For final testing the motion was sinusoidal, more accurately modeling vessel heave. The recorded data set allowed the fatigue cycles and filtering processes to be tested and refined.

In this test, three sensors were mounted on the clamp at 30°, 60°, and 90° from horizontal. The 90° sensor (blue) recorded the highest strain changes, as it is located furthest from the centroid.

Figure 23:
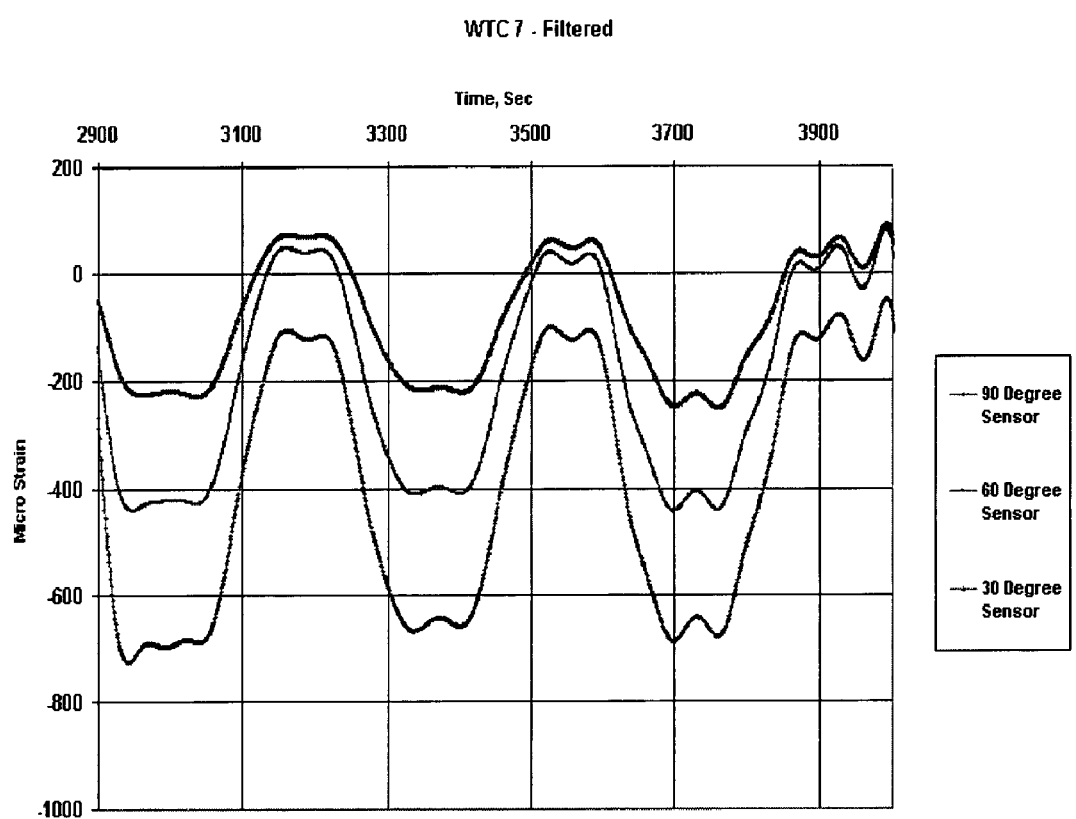
FIG. 23 shows the filtered data from the scale model test.

FIG. 23 shows the filtered data. The smaller frequencies of change have been removed. This has the effect of removing noise and leaving real data. Because the motion of the computerized ram paused at the maximum extension, a double peak effect is shown. This effect would not occur in sinusoidal or real heave data.

Figure 24:
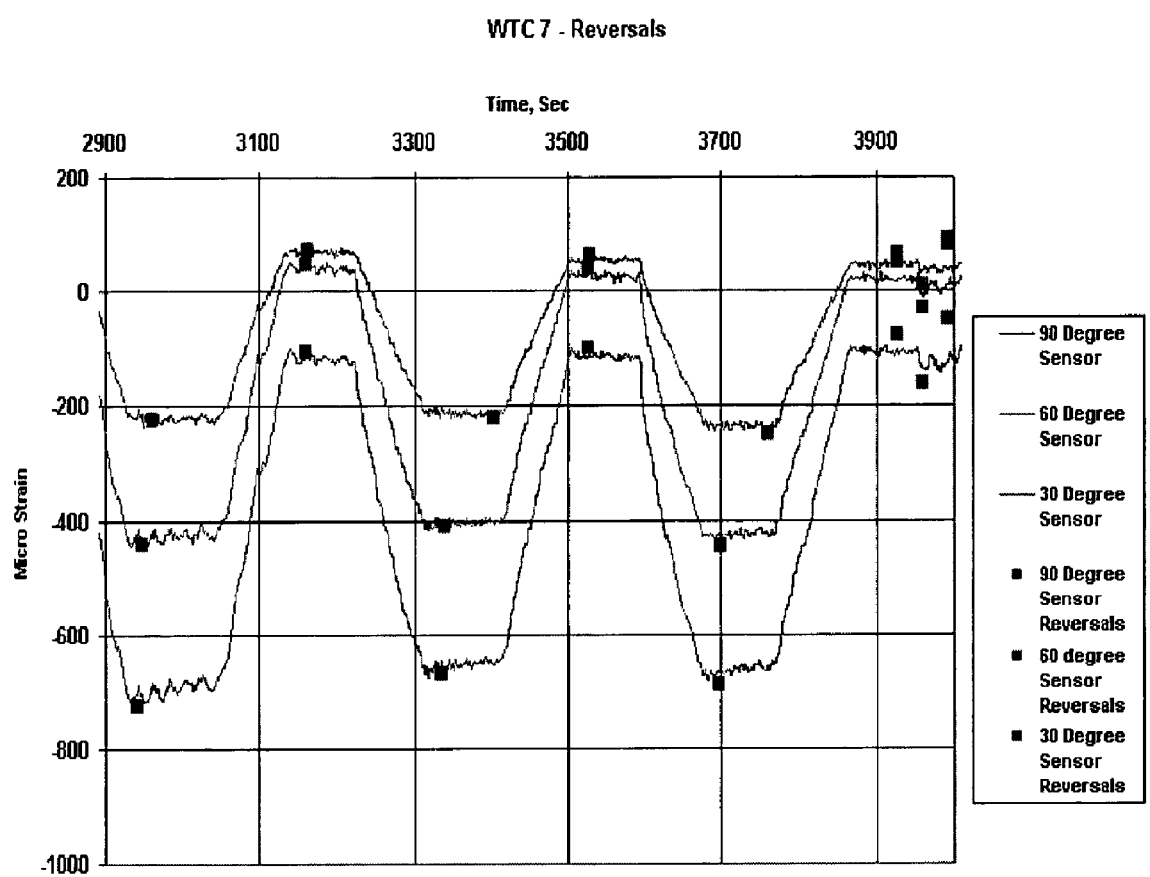
FIG. 24 shows the reversals calculated by the rain flow-counting program.

FIG. 24 shows the reversals calculated by the rain flow-counting program. A reversal is a point where the trend changes; the time between reversals is a half-cycle. It can be seen that the half cycle locations were successfully located. The number of cycles and magnitude of the cycles can be counted easily. This provides sufficient information to calculate the fatigue of the SCR.

To calculate fatigue, the principle (maximum) strain is required. The principle strain's direction is required to calculate its magnitude. For an SCR, the maximum strain will occur at the top and bottom of the pipe section. If the angle between two sensors is known, the principle strain direction and magnitude can be calculated. Where three or more sensors are used, averaging allows a more accurate value to be recorded.

Figure 25:
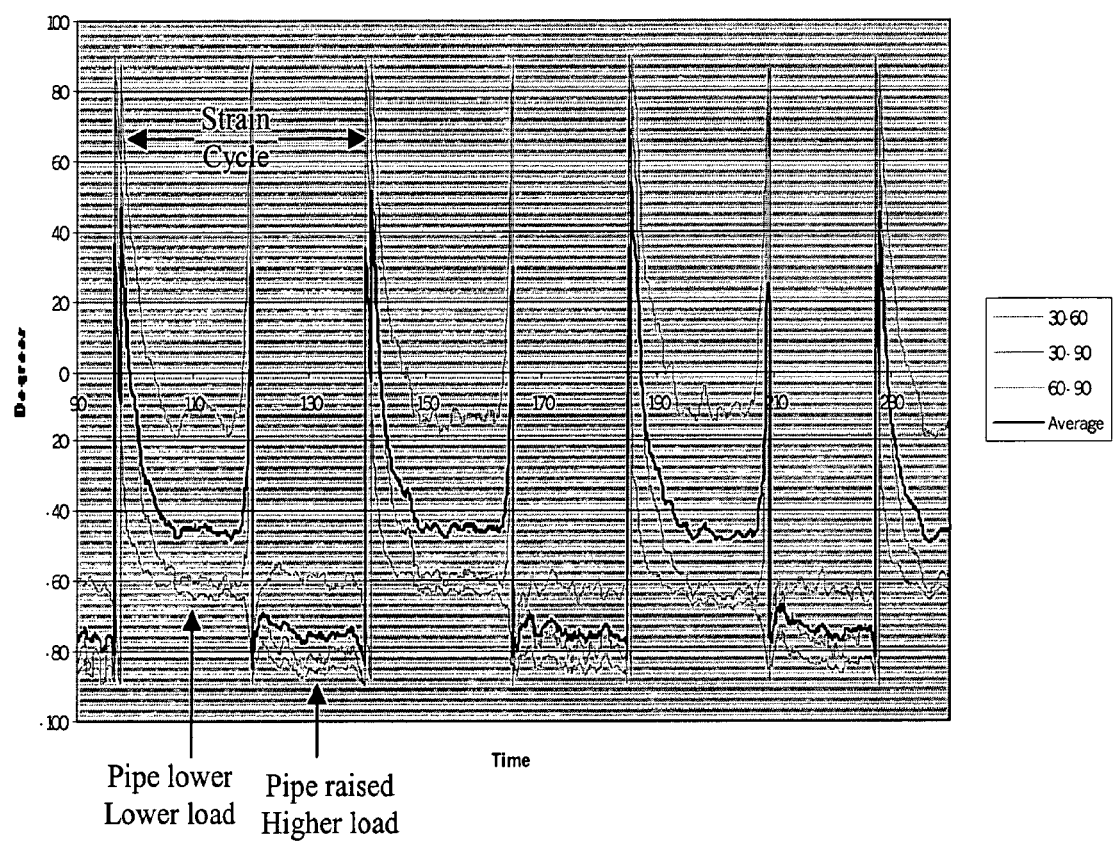
FIG. 25 shows the angle from horizontal for the principle strain direction.

The calculation of the principle strain magnitude and direction was assessed in the scale model tests. FIG. 25 shows the angle from horizontal for the principle strain direction. Where the strain values returned to zero, the system recorded a peak value, this occurred at every half cycle. The results show that the principle strain was near vertical for the "crest of wave" heave but this angle changed in the "trough." It is believed that the pipe rotated to its "preferred" direction while not loaded and when the load was applied the principle stress moved the pipe to vertical position.

Recording the orientation of the pipe joints will allow the relative rotation of pipes to be assessed. If a riser was instrumented on either side of a joint, the directions could be monitored and a change in the relative direction would indicate that the thread of a joint was working itself loose.

The fatigue monitoring system's determination of the principle strain direction and the counting of stress/strain cycles worked successfully. The measurement of the principle strain magnitude was not successful, but the forces involved are understood. The composite section will be considerably easier to achieve with a steel SCR pipe.

The apparatuses and methods described herein allow the loading, behavior, and fatigue of the risers to be monitored and understood, during both normal operations and large metocean events. Failure of the SCR and loss of hydrocarbons could be prevented.

Using optical strain sensors and the relatively compact carrier cables, exploration and production companies can practically measure the information needed. Benefits of the present invention include, but are not limited to, the following:

Production could be maintained under very severe conditions, such as the extreme sea currents in the Gulf of Mexico during 1999, because precise and continuous information would be available to determine riser integrity.

Joints could be precisely tracked and optimized by knowing how much of the fatigue life has been used up—reducing costs in casing.

Although the present invention and its advantages have been described in detail, it should be understood that various changes, substitutions, and alterations could be made herein without departing from the spirit and scope of the invention as defined by the appended claims.

What is claimed is:

1. An apparatus for monitoring fatigue, structural response, and operational limits on steel catenary risers comprising:
   a multi-strand optical cable that extends down the length of the riser; and
   a plurality of optical fiber strain sensors spaced continuously and circumferentially about a cross-section of the riser and attached to the outer surface of the riser, said sensors being connected to said optical cable.

2. The apparatus of claim 1, wherein each of said sensors measures the direction of the strain, both circumferentially and longitudinally, and the magnitude of the strain, both for the riser in tension and in compression.

3. The apparatus of claim 2, further comprising:
   a computer for recording and analyzing the measurements received from each of said plurality of sensors.

4. The apparatus of claim 1 wherein said plurality of sensors are attached to an area of the riser from about 0 feet to about 640 feet from the surface end of the riser.

5. The apparatus of claim 1 wherein said plurality of sensors are attached to the touch down area of the riser.

6. The apparatus of claim 1 wherein said plurality of sensors are attached to an area of the riser from about 0 feet to about 640 feet from the sea floor end of the riser.

7. The apparatus of claim 1 wherein said plurality of sensors are attached to the outer surface of the riser before the riser is installed underwater.

8. The apparatus of claim 1 wherein said plurality of sensors are attached to the outer surface of the riser after the riser is installed underwater.

9. An apparatus for monitoring fatigue, structural response, and operational limits on steel catenary risers having vortex suppression devices comprising:
   a multi-strand optical cable that extends down the length of the riser; and
   a plurality of optical fiber strain sensors spaced continuously and circumferentially about a cross-section of the riser and attached to the outer surface of the riser, said sensors being connected to said optical cable.

10. The apparatus of claim 9, wherein each of said sensors measures the direction of the strain, both circumferentially and longitudinally, and the magnitude of the strain, both for the riser in tension and in compression.

11. The apparatus of claim 10, further comprising:
a computer for recording and analyzing the measurements received from each of said plurality of sensors.

12. A method for monitoring fatigue, structural response, and operational limits on steel catenary risers comprising:
providing a multi-strand optical cable that extends down the length of the riser; and
installing a plurality of optical fiber strain sensors spaced continuously and circumferentially about a cross-section of the riser and attached to the outer surface of the riser, said sensors being connected to said optical cable.

13. The method of claim 12, wherein each of said sensors comprises an instrumented curved plate.

14. The method of claim 13, wherein said step of installing further comprises: using sub-sea epoxy and an underwater ROV to attach said instrumented curved plates along the length of the riser.

15. The method of claim 12, wherein each of said sensors comprises an instrumented clamp.

16. The method of claim 15, wherein said step of installing further comprises:
using sub-sea epoxy and an underwater ROV to attach said instrumented clamps along the length of the riser.

* * * * *